United States Patent
Choi

(10) Patent No.: US 9,099,927 B2
(45) Date of Patent: Aug. 4, 2015

(54) MULTI-VOLTAGE POWER SUPPLY AND ELECTRONIC APPARATUS INCLUDING THE SAME

(75) Inventor: Jong-moon Choi, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 714 days.

(21) Appl. No.: 13/334,582

(22) Filed: Dec. 22, 2011

(65) Prior Publication Data

US 2012/0161514 A1    Jun. 28, 2012

(30) Foreign Application Priority Data

Dec. 24, 2010   (KR) .................. 10-2010-0134867

(51) Int. Cl.
*H02J 3/00* (2006.01)
*H02M 3/335* (2006.01)

(52) U.S. Cl.
CPC ...... *H02M 3/33561* (2013.01); *H02M 3/33576* (2013.01)

(58) Field of Classification Search
CPC ...................... H02M 3/33561; H02M 3/33576
USPC .......................................................... 307/17
See application file for complete search history.

(56) References Cited

U.S. PATENT DOCUMENTS

| | | | |
|---|---|---|---|
| 5,126,930 A | 6/1992 | Ahn | |
| 5,841,313 A | 11/1998 | Levin et al. | |
| 6,462,437 B1 | 10/2002 | Marmaropoulos et al. | |
| 7,675,762 B2 * | 3/2010 | Kwon | 363/21.14 |
| 7,933,131 B2 * | 4/2011 | Cho et al. | 363/21.12 |
| 7,940,538 B2 * | 5/2011 | Kwon | 363/89 |
| 8,456,870 B2 * | 6/2013 | Cho et al. | 363/21.12 |
| 8,508,959 B2 * | 8/2013 | Kwon | 363/21.14 |
| 2002/0125867 A1 * | 9/2002 | Choo et al. | 323/282 |
| 2007/0025031 A1 * | 2/2007 | Kwon | 361/38 |
| 2007/0176808 A1 * | 8/2007 | Osaka | 341/136 |
| 2008/0024092 A1 * | 1/2008 | Cho et al. | 323/207 |
| 2008/0309162 A1 * | 12/2008 | Ma et al. | 307/31 |
| 2009/0008995 A1 * | 1/2009 | Cyr | 307/31 |
| 2010/0118566 A1 * | 5/2010 | Kwon | 363/21.09 |
| 2011/0181112 A1 * | 7/2011 | Kwon | 307/31 |
| 2012/0127760 A1 * | 5/2012 | Hosono | 363/21.01 |

FOREIGN PATENT DOCUMENTS

| | | |
|---|---|---|
| CN | 1354904 | 6/2002 |
| CN | 1905342 | 1/2007 |
| JP | 2001-258251 | 9/2001 |
| KR | 1020070014012 | 1/2007 |

OTHER PUBLICATIONS

Chinese Office Action issued Mar. 27, 2015 in corresponding Chinese Patent Application No. 201110442433.9.

* cited by examiner

*Primary Examiner* — Daniel Cavallari
(74) *Attorney, Agent, or Firm* — Staas & Halsey LLP

(57) ABSTRACT

A multi-voltage power supply including a transformer including a primary coil, a first secondary coil, and at least one second secondary coil, a first output unit to output a first output voltage by using a voltage transferred to the first secondary coil of the transformer, at least one second output unit to output at least one second output voltage by using a voltage transferred to the at least one second secondary coil of the transformer, and a power reduction mode controller to control the at least one second output unit to turn off independent of the first output unit according to an external control signal.

16 Claims, 14 Drawing Sheets

MULTI-VOLTAGE POWER SUPPLY AND ELECTRONIC APPARATUS INCLUDING THE SAME

CROSS-REFERENCE TO RELATED APPLICATIONS

This application claims the benefit of priority under 35 U.S.C. §119 from Korean Patent Application No. 10-2010-0134867, filed on Dec. 24, 2010, in the Korean Intellectual Property Office, the disclosure of which is incorporated herein in its entirety by reference.

BACKGROUND

1. Field of the Invention

The present general inventive concept relates to a power supply, and more particularly, to a multi-voltage power supply capable of reducing power consumption at a sleep mode.

2. Description of the Related Art

In general, devices, such as personal computers (PCs), printers, photocopiers, etc. require a heavy-duty power supply system having a simple structure, a small size, and consistent power supply capability. In a multi-voltage power supply that includes a first output unit and second through Nth output units, when the converter is turned off or on, outputs of the first output unit and the second through Nth output units are simultaneously turned off or on. A function of independently controlling power output to each output during a sleep mode or a low power mode to reduce power consumption is needed.

SUMMARY

The present general inventive concept provides a multi-voltage power supply capable of power consumption reduction by independently controlling multiple voltages.

Additional features and utilities of the present general inventive concept will be set forth in part in the description which follows and, in part, will be obvious from the description, or may be learned by practice of the general inventive concept.

The present genera inventive concept also provides an image forming apparatus including a multi-voltage power supply capable of power consumption reduction.

Features and/or utilities of the present general inventive concept may be realized by a multi-voltage power supply to provide at least two output voltages, the multi-voltage power supply including a transformer comprising a primary winding including a primary coil and a secondary winding including a first coil and at least one second coil having predetermined winding ratios with the primary coil, a first output circuit to generate a first output voltage using a voltage transferred to the first coil, a first output voltage controller to control a voltage supplied to the primary coil by feeding back the first output voltage, at least one second output circuit to generate at least one second output voltage using a voltage transferred to the at least one second coil, at least one second output controller corresponding to the at least one second output circuit, and to feed back the at least one second output voltage to control the at least one second output voltage, and at least one power reduction mode controller corresponding to the at least one second output circuit, and to output a control signal to control an on/off status of outputting of the at least one second output voltage by the at least one second output circuit according to an external control signal.

The at least one power reduction mode controller may include a switching device that switches between an OFF state and an ON state according to the external control signal, and outputs the control signal to control the on/off status of outputting of the at least one second output voltage.

The switching device may include at least one of a metal oxide semiconductor field effect transistor (MOSFET) and a bipolar junction transistor (BJT).

The external control signal may be output by at least one of an image forming apparatus and a controller of a computer.

When the multi-voltage power supply comprises a plurality of second output circuits, the at least one power reduction mode controller may output a single control signal to commonly control the on/off status of outputting of the at least one second output voltage by the plurality of the second output circuits according to the external control signal.

The at least one second output circuit may include a rectifier to rectify the voltage transferred to the at least one second coil of the transformer and to output the rectified voltage, and a switch to linearly switch outputting of the at least one second output voltage according to a control signal output by the at least one second output controller, and to perform the on/off switching operation of outputting of the at least one second output voltage according to the control signal output by the at least one power reduction mode controller.

The at least one second output controller may include a reference voltage generator to generate a reference voltage, an error detector to compare the reference voltage generated by the reference voltage generator with the at least one second output voltage and to output an error value according to the comparison result; a compensation circuit connected in parallel to an input terminal of the error detector to which the at least one second output voltage is applied and an output terminal of the error detector to provide a compensation to the error value by using a negative feedback, and a control signal output unit to voltage-divide the compensated error value and to output a linear control signal to linearly control the second switch operating in an active region.

Features and/or utilities of the present general inventive concept may also be realized by an image forming apparatus including an image forming unit to form an image by receiving a power supply, and to output a power consumption reduction control signal, a multi-voltage power supply to provide a plurality of outputs as the power supply to the image forming unit and to receive the power consumption reduction control signal from the image forming unit, the multi-voltage power supply including a transformer comprising a primary winding including a primary coil and a secondary winding including a first coil and at least one second coil having predetermined winding ratios with the primary coil, a first output circuit to generate a first output voltage using a voltage transferred to the first coil, a first output voltage controller to control a voltage supplied to the primary coil by feeding back the first output voltage, at least one second output circuit to generate at least one second output voltage using the voltage transferred to the at least one second coil, at least one second output controller corresponding to the at least one second output circuit, and to feed back the at least one second output voltage to control the at least one second output voltage, and at least one power reduction mode controller corresponding to the at least one second output circuit, and to output a control signal to control an on/off status of outputting of the at least one second output voltage output by the at least one second output circuit according to the power consumption reduction control signal.

The at least one power reduction mode controller may include a switching device that switches between an ON state and an OFF state according to the power consumption reduction control signal, and outputs the control signal to control the on/off status of outputting the at least one second output voltage.

Features and/or utilities of the present general inventive concept may also be realized by a multi-voltage power supply to provide at least two output voltages, the multi-voltage power supply including a transformer comprising a primary winding including a primary coil and a secondary winding including a first coil and at least one second coil, a first output circuit to generate a first output voltage using a voltage transferred to the first coil, a first output voltage controller to control a voltage supplied to the primary coil by feeding back the first output voltage, at least one second output circuit to rectify a voltage transferred to the second coil and to generate at least one second output voltage by switching an on/off status of a switch corresponding to the at least one second output voltage; at least one second output controller corresponding to the at least one second output circuit, and to feed back the at least one second output voltage to control an on/off status of the second switch of the at least one second output circuit, the at least one second output controller including an output voltage detector to detect the at least one second output voltage, an error detector to compare the at least one second output voltage detected by the output voltage detector with a predetermined reference voltage, and to output an error value according to the comparison result, a frequency synchronization unit to synchronize a predetermined ramp signal input from the outside with a switching frequency of the primary winding of the transformer and to output the synchronized signal; a compensation circuit connected in parallel to an input terminal of the error detector to which the at least one second output voltage is applied and an output terminal of the error detector to provide a compensation to the error value by using a negative feedback, and a pulse width modulator (PWM) to generate a first control signal to control a switching operation of the switch of the at least one second output circuit by comparing an output signal provided by the error detector to the synchronized ramp signal output from the frequency synchronization unit, and at least one power reduction mode controller corresponding to the at least one second output circuit, and to output a second control signal to control an on/off status of the switch of the at least one second output circuit according to an external control signal.

The at least one power reduction mode controller may include a switching device that switches between an OFF state and an ON state according to the external control signal, and outputs the control signal to control the on/off status of outputting the at least one second output voltage.

The switching device may include at least one of a metal oxide semiconductor field effect transistor (MOSFET) or a bipolar junction transistor (BJT).

The external control signal may be output by at least one of an image forming apparatus and a controller of a computer.

When the multi-voltage power supply comprises a plurality of second output circuits, the at least one power reduction mode controller may output a single second control signal to commonly control the on/off status of outputting of the at least one second output voltage by the plurality of the second output circuits according to the external control signal.

Features and/or utilities of the present general inventive concept may also be realized by an image forming apparatus including an image forming unit to form an image by receiving a power supply, and to output a power consumption reduction control signal, and a multi-voltage power supply to provide a plurality of outputs as the power supply to the image forming unit and to receive the power consumption reduction control signal from the image forming unit, the multi-voltage power supply includes a transformer comprising a primary winding including a primary coil and a second winding including a first coil and at least one second coil having predetermined winding ratios with the primary coil, a first output circuit to generate a first output voltage using a voltage transferred to the first coil, a first output voltage controller to control a voltage supplied to the primary coil by feeding back the first output voltage, at least one second output circuit to rectify the voltage transferred to the at least one second coil and to generate at least one second output voltage by switching an on/off status of a second switch corresponding to the at least one output voltage, the at least one second output circuit comprising, a rectifier to rectify the voltage transferred to the at least one second coil of the transformer and to output the rectified voltage, and a switch to linearly switch outputting of the at least one second output voltage according to a first control signal, and to perform an on/off switching operation on outputting of the at least one second output voltage according to a second control signal, at least one second output controller corresponding to the at least one second output circuit, and to feed back the at least one second output voltage to control the on/off status of the switch of at least one second output circuit, the at least one second output controller including an output voltage detector to detect the at least one second output voltage, an error detector to compare the at least one second output voltage detected by the output voltage detector with a predetermined reference voltage, and to output an error value according to the comparison result, a frequency synchronization unit to synchronize a predetermined ramp signal input from the outside with a switching frequency of the primary winding of the transformer and to output the synchronized signal; a compensation circuit connected in parallel to an input terminal of the error detector to which the at least one second output voltage is applied and an output terminal of the error detector to provide a compensation to the error value by using a negative feedback, and a pulse width modulator (PWM) to generate the first control signal to control a switching operation of the switch by comparing an output signal provided by the error detector to the synchronized ramp signal output from the frequency synchronization unit, at least one power reduction mode controller corresponding to the at least one second output circuit, and to output the second control signal to control the on/off status of the switch of at least one second output circuit according to an external control signal.

The at least one power reduction mode controller may include a switching device that switches between an OFF state and an ON state according to the external control signal, and outputs the control signal to control the on/off status of outputting the at least one second output voltage.

Features and/or utilities of the present general inventive concept may also be realized by a multi-voltage power supply including a transformer including a primary coil, a first secondary coil, and at least one second secondary coil, a first output unit to output a first output voltage by using a voltage transferred to the first secondary coil of the transformer, at least one second output unit to output at least one second output voltage by using a voltage transferred to the at least one second secondary coil of the transformer, and a power reduction mode controller to control the at least one second output unit to turn off independent of the first output unit according to an external control signal.

The multi-voltage power supply may include a primary circuit connected to the primary coil of the transformer to provide a voltage to the primary coil of the transformer.

The multi-voltage power supply may include a first output voltage control unit to control a level of the first output voltage by feeding back the first output voltage to the primary circuit, and at least one second output voltage control unit to control a level of the at least one second output voltage by feeding back the at least one second output voltage to the at least one second output unit.

The primary circuit may include a current source type switching circuit to perform a switching operation to control a voltage transfer operation of the transformer.

The current source type switching circuit may include at least one of a flyback converter type circuit, an active clamp flyback type circuit, a half-bridge flyback type circuit, and a series resonance type circuit.

The at least one second output unit may include a rectifier to rectify the voltage transferred to the secondary coil of the transformer.

The at least one second voltage control unit may include an error detector to detect a difference between the at least one second output voltage and a predetermined reference voltage.

The at least one second voltage control unit may include a pulse width modulator to generate a switching control signal according to the detected difference between the at least one second output voltage and the predetermined reference voltage.

The at least one second voltage control unit may include a control signal output unit to generate a switching control signal according to the detected difference between the at least one second output voltage and the predetermined reference voltage Features and/or utilities of the present general inventive concept may also be realized by an electronic apparatus having a power reduction mode, the electronic apparatus including a main unit configured to receive power at a plurality of voltages and to output a power reduction mode control signal to indicate when the electronic apparatus is in the power reduction mode, and a multi-voltage power supply to supply the power at the plurality of voltages to the main unit, the multi-voltage power supply including a transformer including a primary coil, a first secondary coil, and at least one second secondary coil, a first output unit to output a first output voltage to the main unit by using a voltage transferred to the first secondary coil of the transformer, at least one second output unit to output at least one second output voltage to the main unit by using a voltage transferred to the at least one second secondary coil of the transformer, and a power reduction mode controller to receive the power reduction mode control signal from the main unit and to control the at least one second output unit to turn off independent of the first output unit according to the power reduction mode control signal when the electronic apparatus is in the power reduction mode.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE EMBODIMENTS

Figure 1:
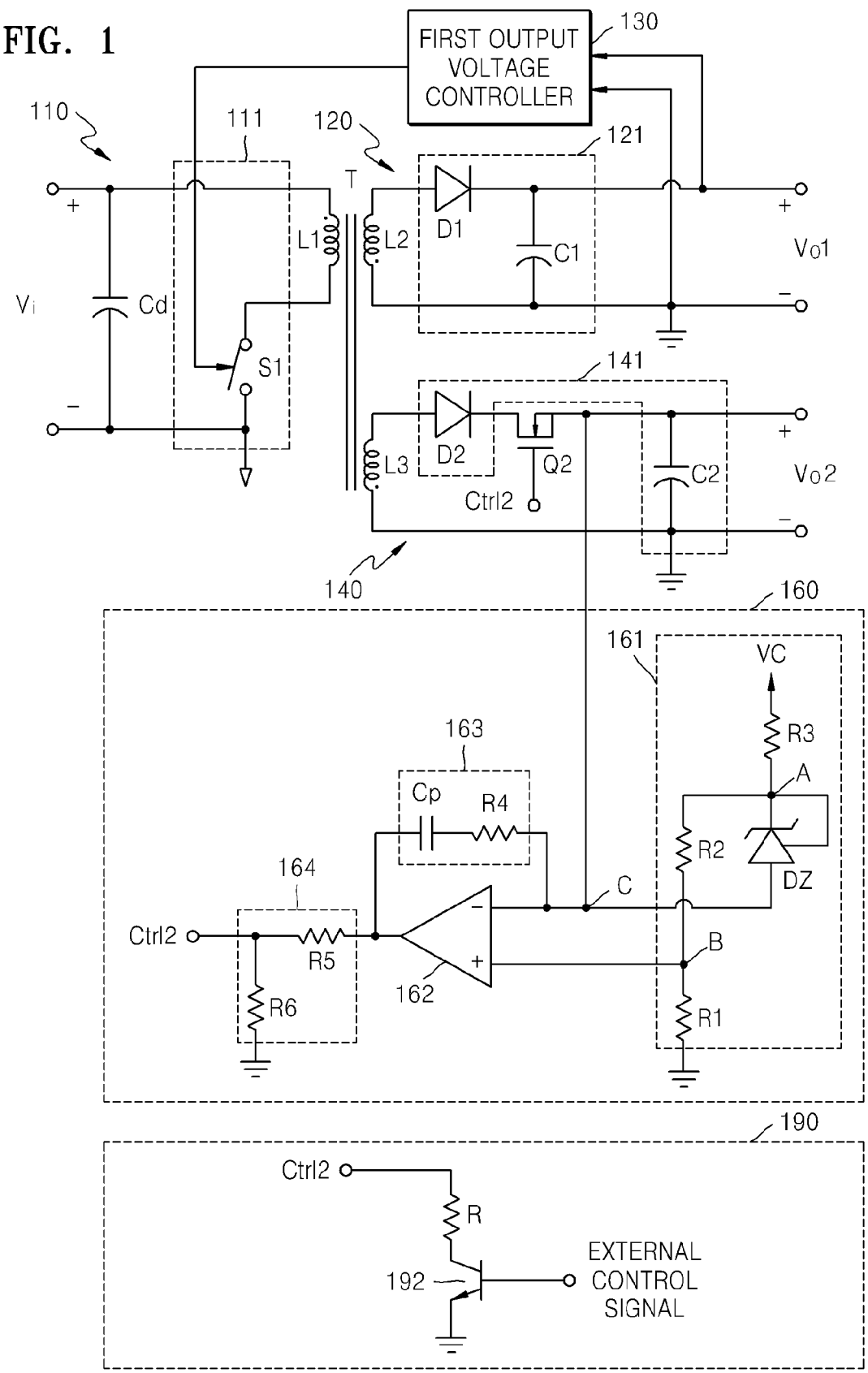
FIG. 1 is a circuit diagram of a multi-voltage power supply according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a circuit diagram of a multi-voltage power supply capable of power consumption reduction according to an embodiment of the present general inventive concept. More particularly, FIG. 1 illustrates a current source type two-voltage power supply in which a second output voltage is blocked by using an external control signal that occurs when power consumption reduction is necessary. Although a two-voltage power supply is described in the current embodiment, a multi-voltage power supply can be configured to output N (N is a natural number) output voltages according to an implementation environment. If the number of output voltages is N, a transformer includes N secondary coils, and a secondary output circuit can be connected to each of the N secondary coils.

Referring to FIG. 1, the multi-voltage power supply includes a transformer T having a primary coil L1 and two secondary coils, i.e., a first coil L2 and a second coil L3, forming predetermined winding ratios with the primary coil L1. A primary circuit 110 is connected to the primary coil L1, a first output circuit 120 is connected to the first coil L2 in the secondary winding, and a second output circuit 140 is connected to the second coil L3 in the secondary winding. The primary circuit 110 is isolated from the first and second output circuits 120 and 140 of the secondary winding by the transformer T.

The primary circuit 110 includes a current source type switching circuit 111 connected to the primary coil L1 of the transformer T. The current source type switching circuit 111 controls an energy storing or transfer operation of the transformer T by performing a switching operation in response to a first control signal applied by a first output voltage controller 130.

The current source type switching circuit 111 can include a first control switch S1 connected between the primary coil L1 of the transformer T and ground. If the first control switch S1 is in an ON state (closed), a voltage having a polarity opposite to that of the primary coil L1 of the transformer T is induced in the secondary coils L2 and L3, resulting in an inverse bias state of diodes D1 and D2 included in the first and second output circuits 120 and 140. Accordingly, currents flowing through the first and second output circuits 120 and 140 are blocked, and energy is stored in the form of a magnetization inductance of the transformer T. That is, when the first control switch S1 is in the ON state (closed), a current is not transferred via the transformer T, and the energy supplied to the primary coil L1 is stored in the form of the magnetization inductance of the transformer T.

If the first control switch S1 is in an OFF state (open), a voltage having a polarity opposite to when the first control switch S1 is in the ON state is induced to the secondary coils L2 and L3 of the transformer T, resulting in an ON state of the diodes D1 and D2 included in the first and second output circuits 120 and 140. Accordingly, a current due to the magnetization inductance of the transformer T is transferred to the first and second output circuits 120 and 140.

The first output circuit 120 generates a first output voltage $V_{o1}$ by rectifying a voltage transferred to the secondary winding of the transformer T. For the rectification, the first output circuit 120 includes a first rectifier 121 to rectify the voltage. The first rectifier 121 illustrated in FIG. 1 is a half-wave rectifier. In the present embodiment, the first output circuit 120 may include a half-wave or full-wave rectifier.

The first rectifier 121 can include the first diode D1 and a first capacitor C1, which are connected in series, and together are connected in parallel to the first coil L2 in the secondary winding of the transformer T. In this case, a first output terminal used to output the first output voltage $V_{o1}$ can be formed at both ends of the first capacitor C1.

The first output voltage controller 130 can control a voltage supplied to the primary winding of the transformer T according to the first output voltage $V_{o1}$ generated by the first output circuit 120. The first output voltage controller 130 applies the first control signal to the first control switch S1 by feeding back the first output voltage $V_{o1}$. Herein, the first control signal indicates a signal to control a duty rate of the first control switch.

The second output circuit 140 generates a second output voltage $V_{o2}$ by rectifying the voltage transferred from the transformer T. For the rectification, the second output circuit 140 includes a second rectifier 141 and a second switch Q2.

The second rectifier 141 can include the second diode D2 and a second capacitor C2, which are connected in series, and together are connected in parallel to the second coil L3 in the secondary winding of the transformer T, in order to generate the second output voltage $V_{o2}$ by rectifying the voltage transferred from the transformer T. In this case, a second output terminal used to output the second output voltage $V_{o2}$ can be formed at both ends of the second capacitor C2.

The second switch Q2 linearly switches an operation of the second rectifier 141 in an active region in response to a linear control signal Ctrl2 applied from a second output voltage controller 160. The second switch Q2 performs an on/off switching operation on the second rectifier 141 in response to a control signal Ctrl2 applied from a power reduction controller 190.

For the switching operation, the second switch Q2 is disposed between the second diode D2 and the second capacitor C2. The second switch Q2 can be implemented using a metal oxide semiconductor field effect transistor (MOSFET), a gate of which is connected to an output terminal of the second output voltage controller 160, or a bipolar junction transistor (BJT). If the second switch Q2 is implemented using a MOSFET, the second switch Q2 linearly switches an operation of the second rectifier 141 or performs the on/off switching operation thereon by receiving the linear control signal Ctrl2 through the gate of the MOSFET.

The power reduction mode controller 190 generates the control signal Ctrl2 for controlling on/off status of an output of the second output voltage $V_{o2}$ output by the second output circuit 140 independently from the first output circuit 120 by using an external control signal that occurs when power consumption reduction is necessary, and outputs the control signal Ctrl2 to the second output circuit 140.

The power reduction mode controller 190 is connected in parallel to the second output controller 160, and may include a switching device 192.

The switching device 192 is in an OFF state or is in an ON state according to the external control signal. The external control signal may be applied when power consumption reduction is necessary. The switching device 192 outputs the control signal Ctrl2 to control the output of the second output circuit 140. The switching device 192 may be a MOSFET or a BJT.

The external control signal may be output by an image forming apparatus, a controller (not shown) of a computer, and other electric apparatuses. For example, if the image forming apparatus is in a power reduction mode (e.g., a sleep mode, a standby mode, or a low power mode), the controller of the image forming apparatus applies the external control signal to the power reduction mode controller 190 so that the first output voltage $V_{o1}$ is output to the multi-voltage power supply of the present general inventive concept but the second output voltage $V_{o2}$ is not output. The switching device 192 of the power reduction mode controller 190 is in the OFF state or is in the ON state according to the external control signet, and outputs a high signal or a low signal to the second output circuit 140.

Meanwhile, when the multi-voltage power supply includes a plurality of the second output circuits 140, each of the second output circuits 140 may include the power reduction mode controller 190. When the multi-voltage power supply includes a plurality of the second output circuits 140, the power reduction mode controller 190 may be used to commonly control outputs of the second output circuits 140. That is, a single power reduction mode controller may use the external control signal to commonly control on/off states of second output voltages output by the plurality of second output circuits.

Figure 2:
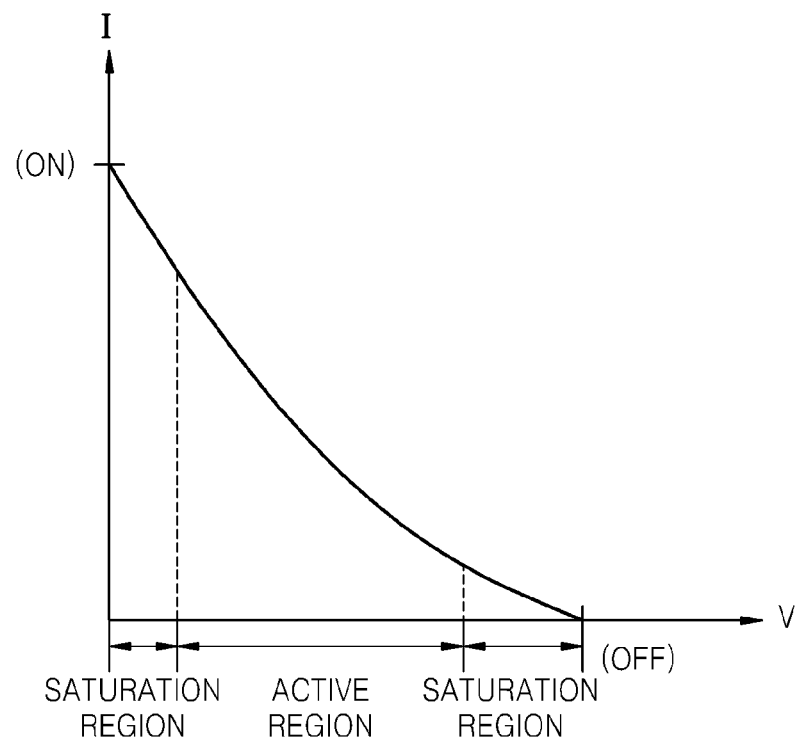
FIG. 2 is a graph illustrating a linear switching operation of a second switch of the multi-voltage power supply of FIG. 1, according to an embodiment of the present general inventive concept.

FIG. 2 is a graph illustrating a linear switching operation of the second switch Q2 of the multi-voltage power supply of FIG. 1, according to an embodiment of the present general inventive concept. If it is assumed that a current flowing through the second switch Q2 is I and a voltage across the second switch Q2 is V, a correlation illustrated in FIG. 2 is formed between the current I and the voltage V. Referring to FIG. 2, the second switch Q2 performs a switching operation in an active region, i.e., a region in which a curve becomes linear, and not in a saturation region. The switching operation in the active region is called a linear switching operation.

The second output voltage controller 160 linearly controls the second output voltage $V_{o2}$ independently of the first output voltage controller 130. The second output voltage controller generates the linear control signal Ctrl2 to control the second switch Q2 operating in the active region by feeding back the second output voltage $V_{o2}$ and applies the generated linear control signal Ctrl2 to the second switch Q2.

The second output voltage controller 160 can include a reference voltage generator 161, an error detector 162, a compensation circuit 163, and a control signal output unit 164.

The reference voltage generator 161 generates a reference voltage to be compared to the second output voltage $V_{o2}$ and outputs the generated reference voltage to the error detector 162. The reference voltage generator 161 can include a first reference voltage generator, which is connected to a predetermined voltage source $V_c$ and generates a first reference voltage, and a voltage divider circuit to generate a second reference voltage by voltage-dividing the first reference voltage.

The first reference voltage generator includes a third resistor R3 connected to the voltage source $V_c$ and a zener diode DZ. At a node A, the first reference voltage (i.e., a value obtained by adding a predetermined voltage, e.g., 2.5 V, to the second output voltage $V_{o2}$) can be generated by the third resistor R3 and the zener diode DZ. That is, a voltage generated at the node A is $V_{o2}+2.5$ V.

The voltage divider circuit includes a first resistor R1 and a second resistor R2, which voltage-divide the first reference voltage generated by the first reference voltage generator. At a node B located between the first resistor R1 and the second resistor R2, the second reference voltage having a value "$(V_{o2}+2.5)\times(R1/(R1+R2))$" according to a voltage dividing formula is generated. The generated second reference voltage is input to a first input terminal of the error detector 162.

Thus, the second reference voltage is input to the first input terminal of the error detector 162, and the second output voltage $V_{o2}$ is input to a second input terminal of the error detector 162. The error detector 162 compares the input second reference voltage and second output voltage $V_{o2}$ and outputs a difference value, i.e., an error value.

The error detector 162 can be realized using a comparator. In this case, since two input terminals of the comparator are in a virtual short state, the voltage at the node B can be considered in a normal state the same as a voltage at a node C, which is the second output voltage $V_{o2}$. Thus, since the voltage at the node B is the same as the voltage at the node C, Equation 1 can be realized as provided below.

$$V_{o2}=(V_{o2}+2.5)\times(R1/(R1+R2)) \quad (1)$$

Thus, the second output voltage $V_{o2}$ can be simplified to Equation 2 as provided below.

$$V_{o2}=2.5\times(R1/R2) \quad (2)$$

That is, the second output voltage $V_{o2}$ to be controlled can be determined by a zener value and resistances of the first and second resistors R1 and R2.

The compensation circuit 163 stabilizes the second output voltage controller 160 by providing a compensation circuit for negative feedback. The compensation circuit 163 may include a fourth resistor R4 and a capacitor $C_p$ connected in series with each other, which are together connected in parallel to the second input terminal and an output terminal of the error detector 162.

The control signal output unit 164 outputs the second control signal Ctrl2 by voltage-dividing an error value output from the error detector 162 in order to linearly control the second switch Q2 operating in the active region. The control signal output unit 164 can include fifth and sixth resistors R5 and R6 for voltage-dividing the error value. Thus, the linear control signal Ctrl2 output through the control signal output unit 164 can be presented using Equation 3 provided below.

$$Ctrl2=V_{err}\times(R6/(R5+R6)) \quad (3)$$

Herein, $V_{err}$ denotes the error value output from the error detector 162.

Thus, a gate voltage of the second switch Q2 has a value "$V_{err}\times(R6/(R5+R6))$". Appropriate values for the resistances of the fifth and sixth resistors R5 and R6 can be determined in order for the second switch Q2 to operate in the active region. Thus, the gate voltage of the second switch Q2 varies in the active region according to the error value output from the error detector 162, thereby varying an equivalent drain-source resistance of the second switch Q2.

Figure 3:
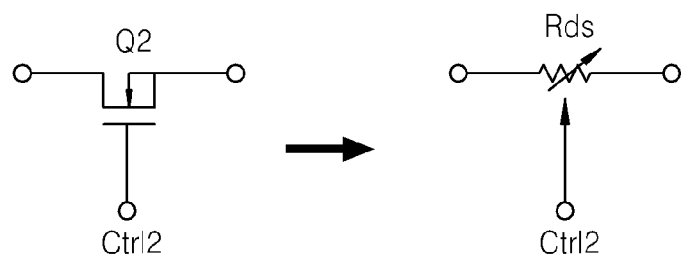
FIG. 3 is an equivalent circuit diagram of the second switch of the multi-voltage power supply of FIG. 1, which is controlled according to a variation of a linear control signal, according to an embodiment of the present general inventive concept.

FIG. 3 is an equivalent circuit diagram of the second switch Q2 of the multi-voltage power supply of FIG. 1, which is controlled according to a variation of the linear control signal Ctrl2, according to an embodiment of the present general inventive concept. As illustrated in FIG. 3, the second switch Q2 can be represented by a variable resistor $R_{ds}$, the resistance of which varies according to the linear control signal Ctrl2. Thus, since a current flowing through the second diode D2 varies in response to the linear control signal Ctrl2, which varies according to a variation of the second output voltage $V_{o2}$, the second output voltage $V_{o2}$ can be controlled.

The multi-voltage power supply according to the embodiments of the present general inventive concept can use various types of circuits. For example, a current source type switching circuit of a primary circuit can be configured using an active clamp flyback type, a half-bridge flyback type, or a series resonance type, in addition to the flyback type illustrated in FIG. 2. Thus, in the embodiments described below, multi-voltage power supplies, in which each of these various current source type switching circuits is applied to a primary circuit, will be described.

Figure 4:
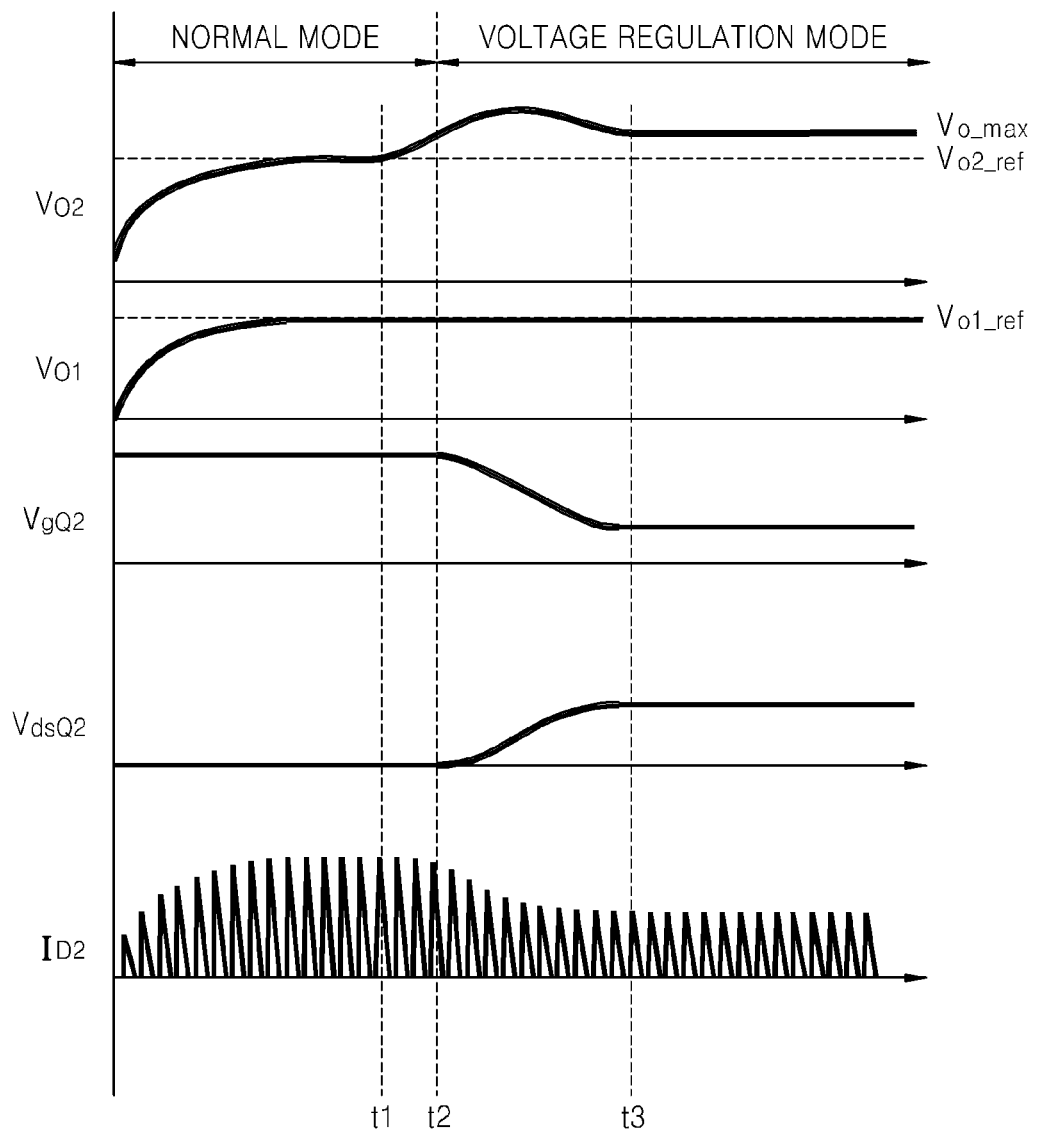
FIG. 4 is a timing diagram illustrating signal transitions according to an operation of the multi-voltage power supply of FIG. 1, according to an embodiment of the present general inventive concept.

FIG. 4 is a timing diagram illustrating signal transitions according to an operation of the multi-voltage power supply of FIG. 1, according to an embodiment of the present general inventive concept. Referring to FIG. 4, if a load on the side of the second output circuit 140 decreases at a time t2, the second output voltage $V_{o2}$ exceeds a maximum limit voltage $V_{o\_max}$. At this time, the linear control signal Ctrl2 of the second output voltage controller 160 is the same as the gate voltage $V_{gQ2}$ of the second switch Q2 and controls the second output voltage $V_{o2}$ by decreasing the gate voltage $V_{gQ2}$ so that the second switch Q2 operates in the active region. That is, like $V_{dsQ2}$, which is the voltage across the second switch Q2, the second switch Q2 acts as a variable resistor by causing a constant voltage decrease from the time t2. In FIG. 4, $I_{D2}$ denotes the current flowing through the second diode D2.

Figure 5:
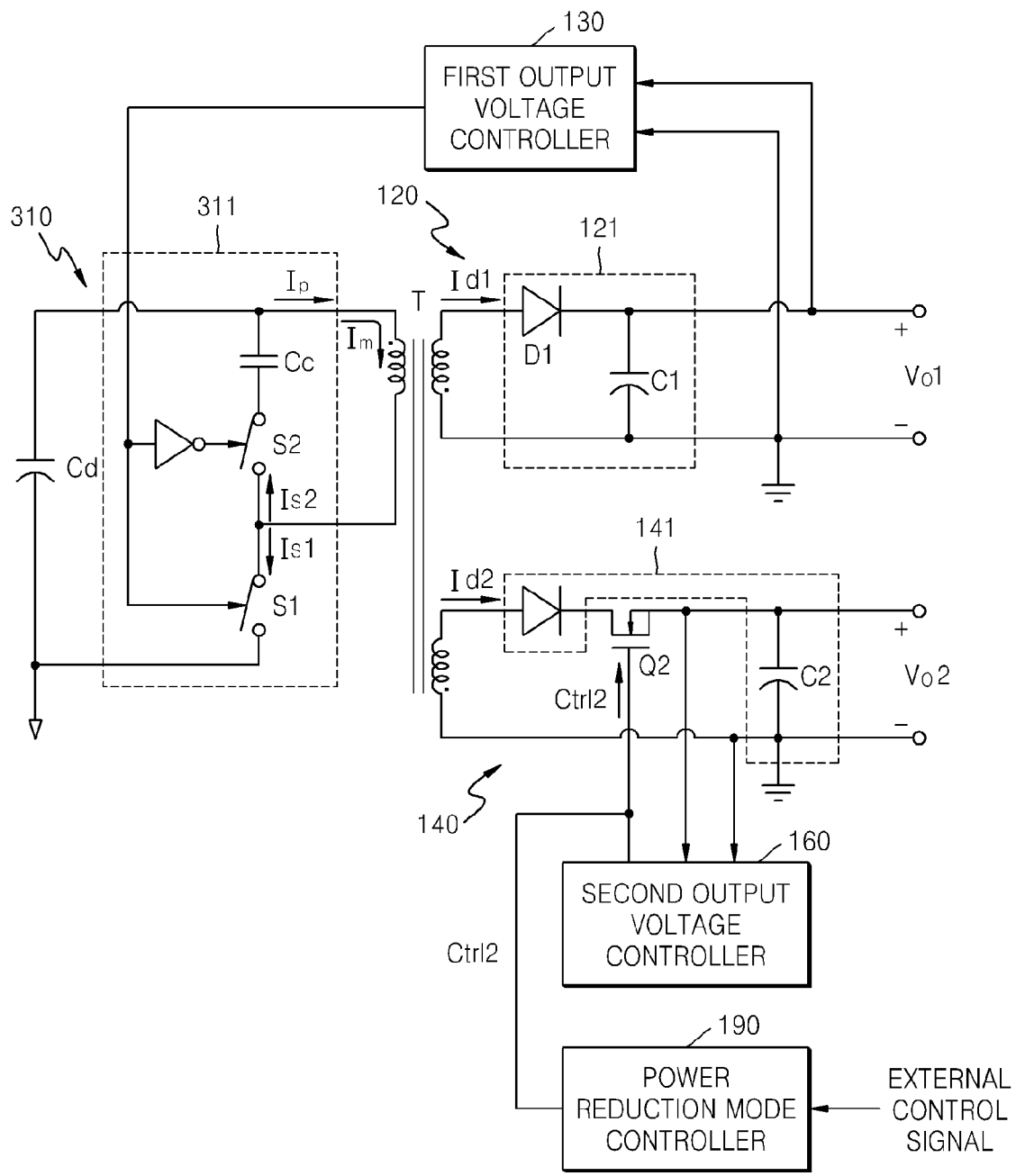
FIG. 5 is a circuit diagram of a multi-voltage power supply according to another embodiment of the present general inventive concept.

FIG. 5 is a circuit diagram of a multi-voltage power supply according to another embodiment of the present general inventive concept. In FIG. 5, a current source type switching circuit 311 is configured as the active clamp flyback type.

The current source type switching circuit 311 of a primary circuit 310 illustrated in FIG. 5 has a structure to which an active snubber circuit is added to prevent a switching loss due to a leakage inductance of a transformer T.

That is, the current source type switching circuit 311 is connected in parallel to a primary coil of the transformer T and includes a capacitor $C_c$ and a second control switch S2 connected in series. Herein, the second control switch S2 and a first control switch S1 operate complementarily and have a short dead time. If the first control switch S1 is in an ON state, energy is stored in the transformer T, and if the first control switch S1 is in an OFF state, the energy stored in the transformer T is transferred to the first and second output circuits 120 and 140 on a secondary winding side of the transformer T. The energy stored in the form of a leakage inductance and a magnetization inductance of the transformer T allows the second control switch S2 and the first control switch S1 to perform zero voltage switching. In addition, the capacitor $C_c$ connected in series with the second control switch S2 resonates with the leakage inductance of the transformer T while a current flows through the secondary winding of the transformer T.

Figure 6:
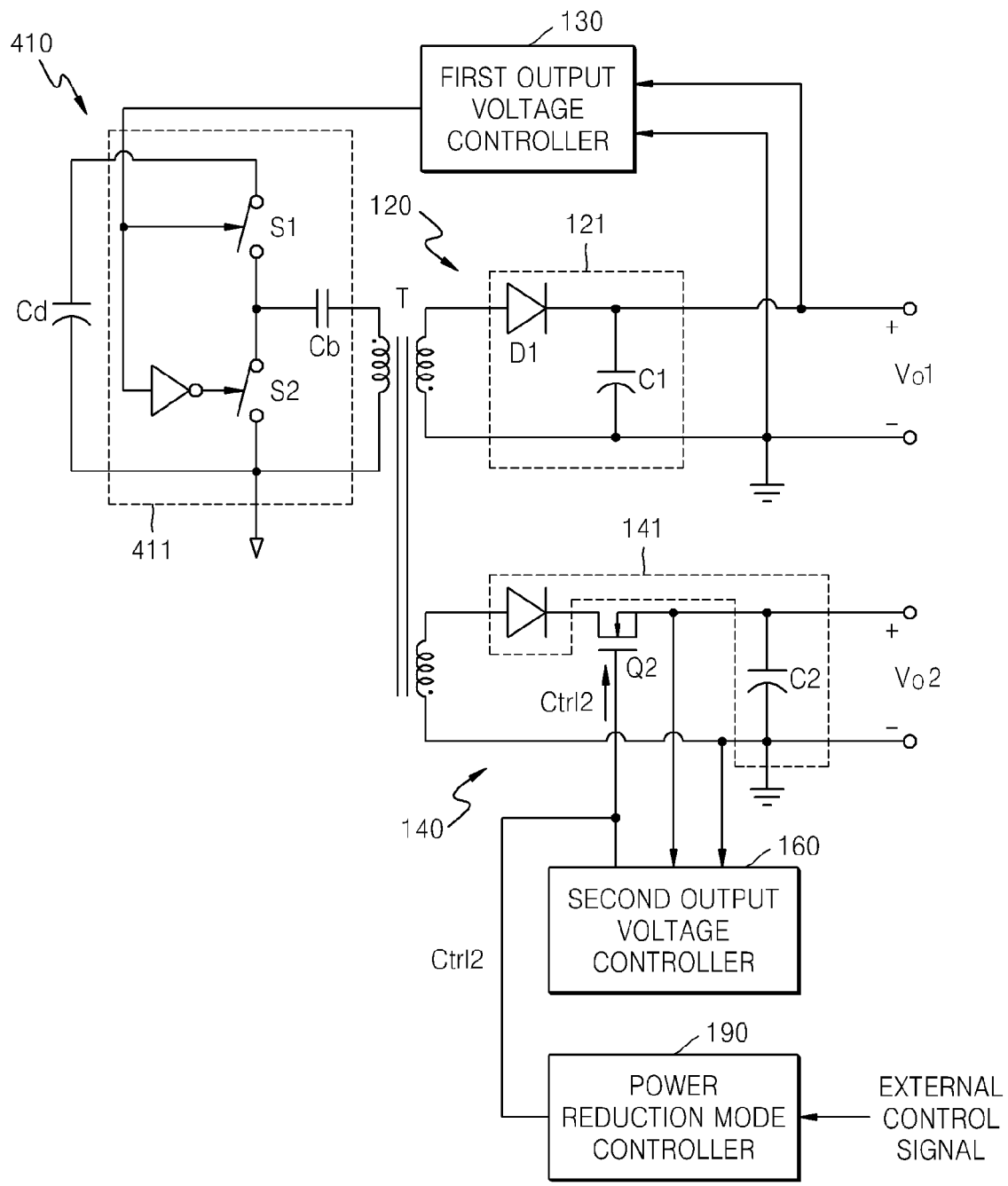
FIG. 6 is a circuit diagram of a multi-voltage power supply according to another embodiment of the present general inventive concept.

FIG. 6 is a circuit diagram of a multi-voltage power supply according to another embodiment of the present general inventive concept. In FIG. 6, a current source type switching circuit 411 is configured as the half-bridge flyback type.

The current source type switching circuit 411 of a primary circuit 410 illustrated in FIG. 6 can include a first control switch S1 and a second control switch S2. The first control switch S1 and the second control switch S2 operate complementarily and have a short dead time. If the first control switch S1 is in an ON state, energy is stored in a transformer T, and if the first control switch S1 is in an OFF state, the energy stored in the transformer T is transferred to first and second output circuits 120 and 140 on a secondary winding side of the transformer T. In addition, a capacitor $C_b$ connected in series with a primary coil of the transformer T charges or discharges energy according to a direction of a current flowing through the primary coil of the transformer T and resonates with a leakage inductance of the transformer T while a current flows through the secondary winding of the transformer T.

Figure 7:
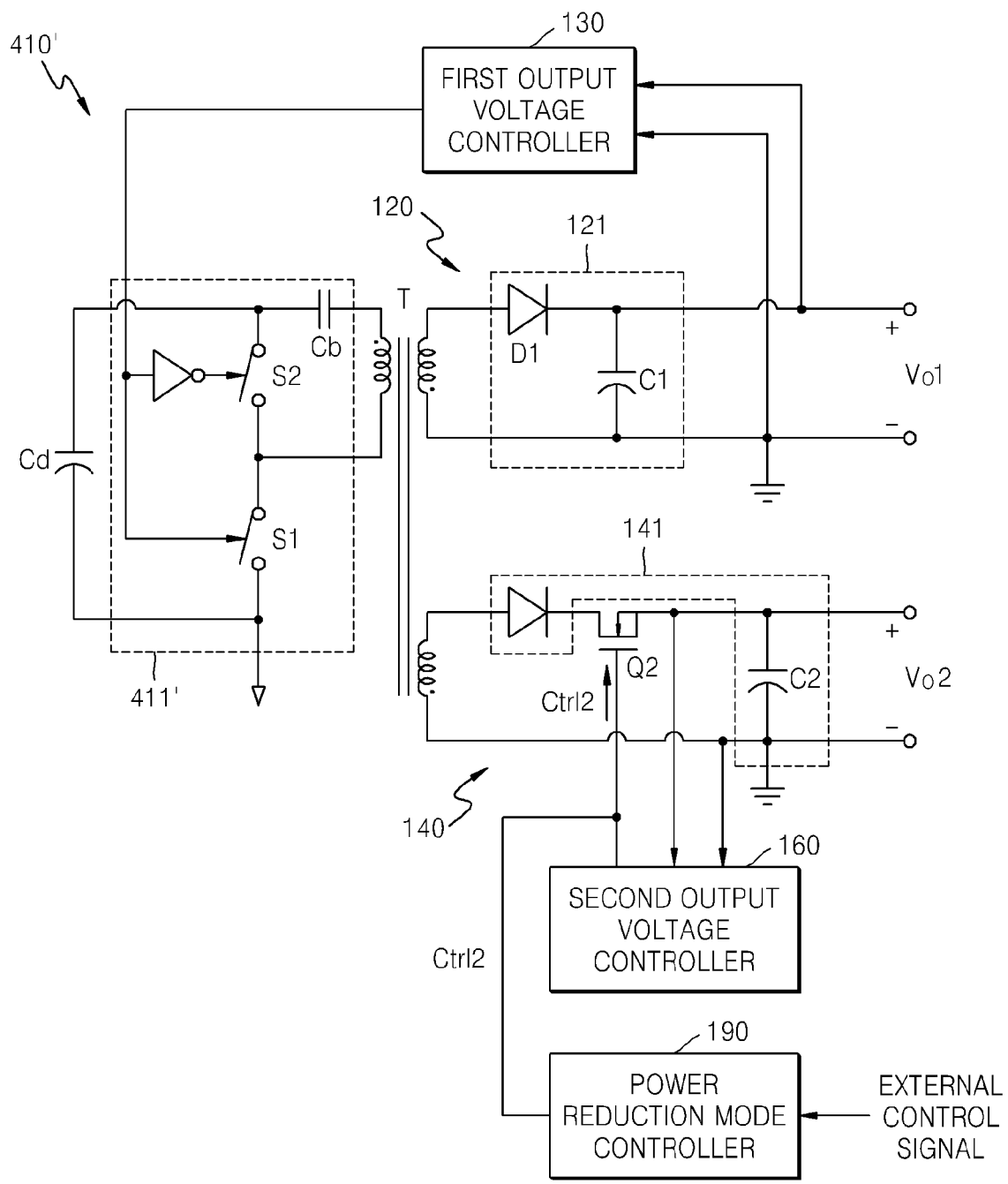
FIG. 7 is a circuit diagram of a different type of multi-voltage power supply, which can be derived from the multi-voltage power supply of FIG. 6, according to an embodiment of the present general inventive concept.

FIG. 7 is a circuit diagram of a multi-voltage power supply according to an embodiment of the present general inventive concept. The multi-voltage power supply illustrated in FIG. 7 is similar to the multi-voltage power supply of FIG. 6. In FIG. 7, a current source type switching circuit 411' of a primary circuit 410' is configured as a half-bridge flyback type.

The current source type switching circuit 411' of a primary circuit 410' illustrated in FIG. 7 can include a first control switch S1 and a second control switch S2. The first control switch S1 and the second control switch S2 operate complementarily and have a short dead time. If the first control switch S1 is in an ON state, energy is stored in a transformer T, and if the first control switch S1 is in an OFF state, the energy stored in the transformer T is transferred to first and second output circuits 120 and 140 on a secondary winding side of the transformer T. In addition, a capacitor $C_b$ connected in series with a primary coil of the transformer T charges or discharges energy according to a direction of a current flowing through the primary coil of the transformer T and resonates with a leakage inductance of the transformer T while a current flows through the secondary winding of the transformer T.

Figure 8:
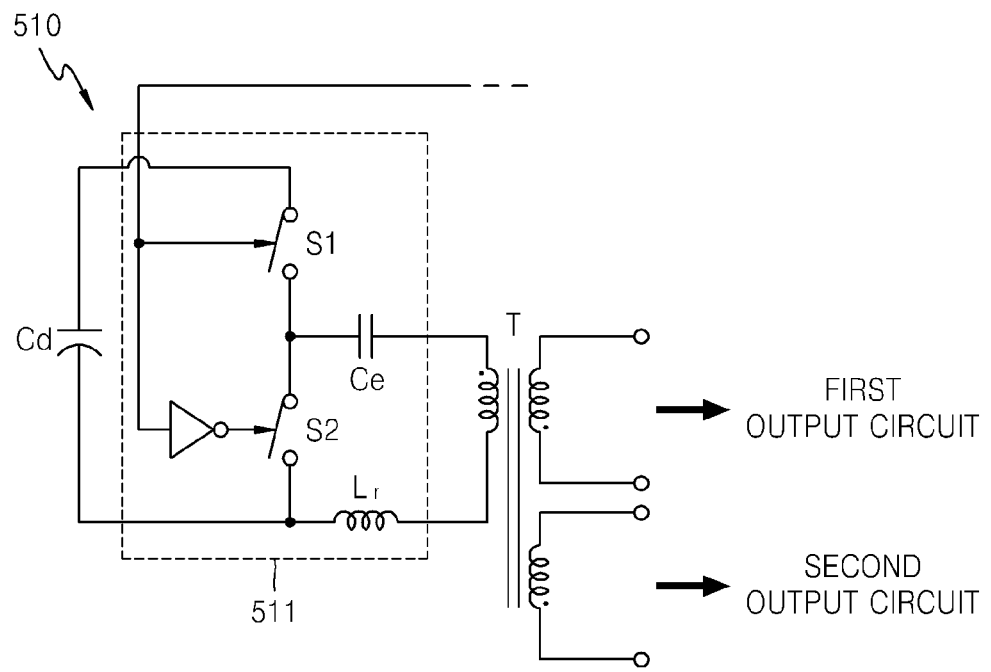
FIG. 8 is a circuit diagram of a multi-voltage power supply according to another embodiment of the present general inventive concept.

FIG. 8 is a circuit diagram of a multi-voltage power supply according to another embodiment of the present general inventive concept. In FIG. 8, a current source type switching circuit 511 is configured as the series resonance type. Referring to FIG. 8, the current source type switching circuit 511 of a primary circuit 510 can include a first control switch S1 and a second control switch S2. The first control switch S1 and the second control switch S2 operate complementarily and have a short dead time. In addition, an inductor $L_r$ connected in series with a capacitor $C_e$ corresponds to a leakage inductance of the transformer T or an additional inductor on the outside of the transformer T. While the first control switch S1 is in an ON or OFF state, the capacitor $C_e$ and the inductor $L_r$ resonate with each other, and energy is transferred to the circuits on the secondary winding side by the transformer T operating as a current source.

Figure 9:
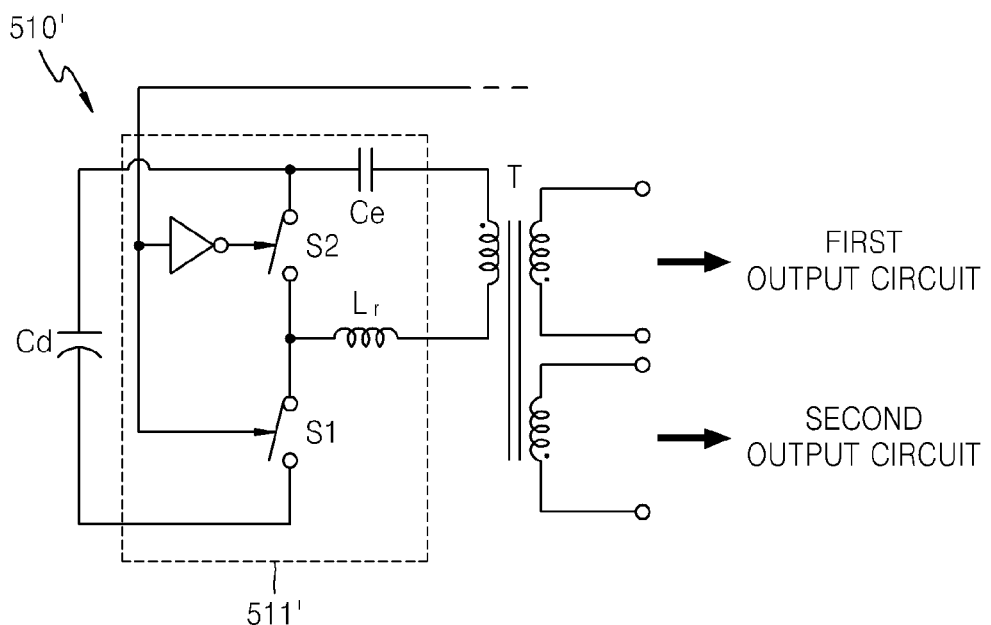
FIG. 9 is a circuit diagram of a different type of multi-voltage power supply, which can be derived from the multi-voltage power supply of FIG. 8, according to an embodiment of the present general inventive concept.

FIG. 9 is a circuit diagram of a multi-voltage power supply according to an embodiment of the present general inventive concept. The multi-voltage power supply illustrated in FIG. 9 is similar to the multi-voltage power supply of FIG. 8. In FIG. 9, a current source type switching circuit 511' is configured as the series resonance type. Referring to FIG. 9, the current source type switching circuit 511' of a primary circuit 510' can include a first control switch S1 and a second control switch S2. The first control switch S1 and the second control switch S2 operate complementarily and have a short dead time. In addition, an inductor $L_r$ connected in series with a capacitor $C_e$ corresponds to a leakage inductance of the transformer T or an additional inductor on the outside of the transformer T. While the first control switch S1 is in an ON or OFF state, the capacitor $C_e$ and the inductor $L_r$ resonate with each other, and energy is transferred to the circuits on the secondary winding side by the transformer T operating as a current source.

In the above embodiments, multi-voltage power supplies having various current source type switching circuits are described. A multi-voltage power supply having a full-wave rectification circuit, in which a first output circuit on a secondary winding side of a transformer can perform full-wave rectification, will now be described.

Figure 10:
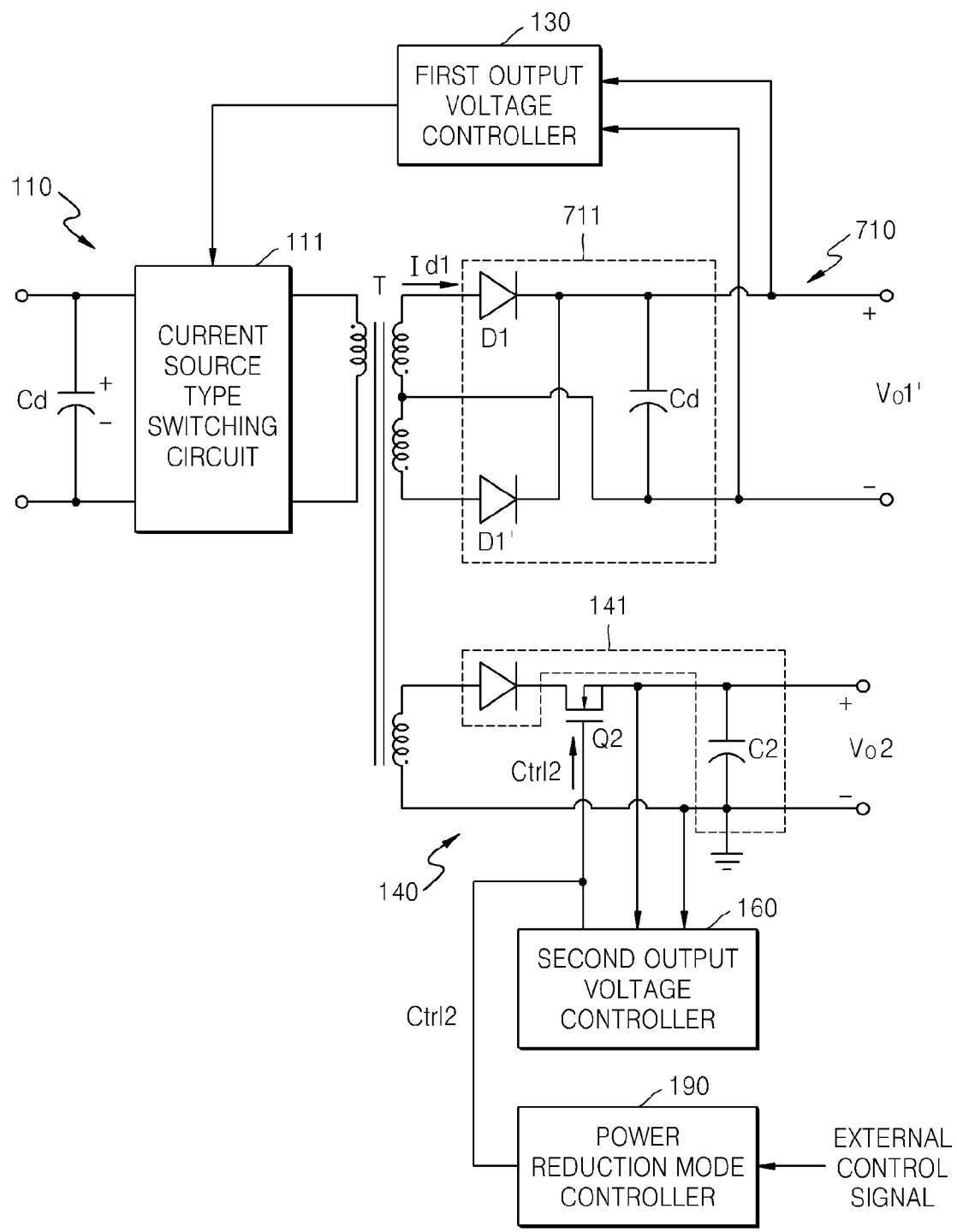
FIG. 10 is a circuit diagram of a multi-voltage power supply according to another embodiment of the present general inventive concept.

FIG. 10 is a circuit diagram of a multi-voltage power supply according to another embodiment of the present general inventive concept. Referring to FIG. 10, a first output circuit 710 includes a full-wave rectifier 711.

The first output circuit 710 has two current paths in order to perform full-wave rectification on a current transferred from a transformer T, and the current paths respectively include diodes D1 or D1'. Thus, the current paths perform rectification by alternatively conducting according to switching performed by a current source type switching circuit 111, thereby outputting a full-wave rectified first output voltage $V_{o1}'$.

In the above-described embodiments, each of the multi-voltage power supplies can independently control a plurality of output circuits on a secondary winding side of a transformer using second through $N^{th}$ output voltage controllers having a simple structure. According to the configurations of the above-described embodiments, the size of each multi-voltage power supply can be significantly reduced compared to conventional current source type power supplies.

Figure 11:
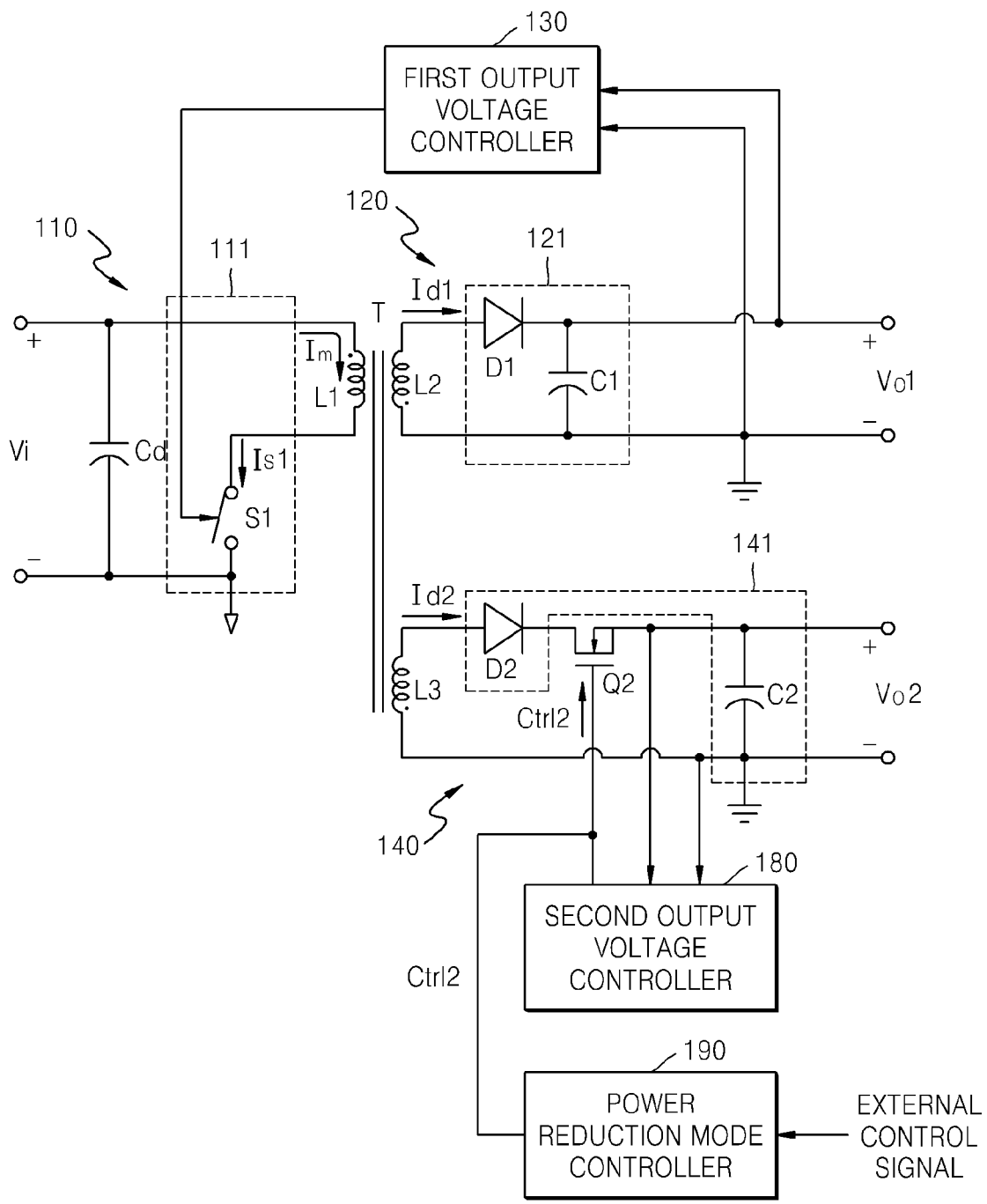
FIG. 11 is a circuit diagram of a multi-voltage power supply according to another embodiment of the present general inventive concept.

FIG. 11 is a circuit diagram of a multi-voltage power supply according to another embodiment of the present general inventive concept. Although a two-voltage power supply is described in the current embodiment, a multi-voltage power supply can be configured to output N (N is a natural number) output voltages according to an implementation environment. If the number of output voltages is N, a transformer includes N secondary coils, and a secondary output circuit can be connected to each of the N secondary coils.

Referring to FIG. 11, the multi-voltage power supply includes a transformer T having a primary coil L1 and two secondary coils, i.e., a first coil L2 and a second coil L3, forming predetermined winding ratios with the primary coil L1. A primary circuit 110 is connected to the primary coil L1, a first output circuit 120 is connected to the first coil L2 in the secondary winding, and a second output circuit 140 is connected to the second coil L3 in the secondary winding. The primary circuit 110 is isolated from the first and second output circuits 120 and 140 of the secondary winding by the transformer T. The primary circuit 110 includes a current source type switching circuit 111 connected to the primary coil L1 of the transformer T. The current source type switching circuit 111 controls an energy storing or transfer operation of the transformer T by performing a switching operation in response to a first control signal applied by a first output voltage controller 130. The current source type switching circuit 111 can include a first control switch S1 connected between the primary coil L1 of the transformer T and a ground. Since the current source type switching circuit 111 is the same as the current source type switching circuit 111 described with respect to FIG. 1, a detailed description is omitted.

The first output circuit 120 generates a first output voltage $V_{o1}$ by rectifying a voltage transferred to the secondary winding of the transformer T. For the rectification, the first output circuit 120 includes a first rectifier 121 to rectify the voltage. The first rectifier 121 illustrated in FIG. 11 is a half-wave rectifier. In the present embodiment, the first output circuit 120 may include a half-wave or full-wave rectifier. Since the first output circuit 120 is the same as the first output circuit 120 described with respect to FIG. 1, a detailed description is omitted.

The first output voltage controller 130 controls a voltage supplied to the primary winding of the transformer T according to the first output voltage $V_{o1}$ generated by the first output circuit 120. Since the first output voltage controller 130 is the same as the first output voltage controller 130 described with respect to FIG. 1, a detailed description is omitted.

The second output circuit 140 generates a second output voltage $V_{o2}$ by rectifying the voltage transferred from the transformer T. For the rectification, the second output circuit 140 includes a second rectifier 141 and a second switch Q2.

The second rectifier 141 can include a second diode D2 and a second capacitor C2, which are connected in series, and together are connected in parallel to the second coil L3 in the secondary winding of the transformer T, in order to generate the second output voltage $V_{o2}$ by rectifying the voltage transferred from the transformer T. In this case, a second output terminal to output the second output voltage $V_{o2}$ can be formed at both ends of the second capacitor C2.

The second switch Q2 switches an operation of the second rectifier 141 in an active region in response to a switching control signal Ctrl2 applied from a second output voltage controller 180. The second switch Q2 switches the operation of the second rectifier 141 in response to the control signal Ctrl2 applied from the power reduction mode controller 190.

For the switching operation, the second switch Q2 is disposed between the second diode D2 and the second capacitor C2. The second switch Q2 can be implemented using a MOSFET, a gate terminal or a base terminal of which is connected to an output terminal of the second output voltage controller 180, or a BJT. If the second switch Q2 is implemented using a MOSFET, the second switch Q2 switches an operation of the second rectifier 141 by receiving the linear switching control signal Ctrl2 through the gate of the MOSFET.

The power reduction mode controller 190 generates the control signal Ctrl2 for controlling an on/off status of an output of the second output voltage $V_{o2}$ output by the second output circuit 140 independently from the first output circuit 120 by using an external control signal that occurs when power consumption reduction is necessary, and outputs the control signal Ctrl2 to the second output circuit 140.

The power reduction mode controller 190 is connected in parallel to the second output controller 160, and may include the switching device 192. The switching device 192 is in an OFF state or is in an ON state according to the external control signal. The external control signal may be applied power consumption reduction is necessary. The switching device 192 outputs the control signal Ctrl2 to control the output of the second output circuit 140, and can be implemented using a MOSFET, a gate terminal or a base terminal of which is connected to the external control signal, or a BJT. The external control signal may be output by an image forming apparatus, a controller (not shown) of a computer, and other electric apparatuses. For example, if the image forming apparatus is in a power reduction mode (e.g., a sleep mode, a standby mode, or a low power mode), the controller of the image forming apparatus applies the external control signal to the power reduction mode controller 190 so that the first output voltage $V_{o1}$ is output to the multi-voltage power supply of the present general inventive concept but the second output voltage $V_{o2}$ is not output. The switching device 192 of the power reduction mode controller 190 is in the OFF state or is in the ON state according to the external control signal and outputs a high signal or a low signal to the second output circuit 140.

Meanwhile, when the multi-voltage power supply includes a plurality of the second output circuits 140, each of the second output circuits 140 may include the power reduction mode controller 190. When the multi-voltage power supply includes a plurality of the second output circuits 140, the power reduction mode controller 190 may be used to commonly control outputs of the second output circuits 140. That is, a single power reduction mode controller may use the external control signal to commonly control on/off states of outputs of second output voltages output by the plurality of second output circuits.

The second output voltage controller 180 controls the second output voltage $V_{o2}$ independently of the first output voltage controller 130. The second output voltage controller 180 generates the switching control signal Ctrl2 to control the second switch Q2 by feeding back the second output voltage $V_{o2}$ and applies the generated switching control signal Ctrl2 to the second switch Q2. The switching control signal Ctrl2 will be described in more detail later.

Figure 12:
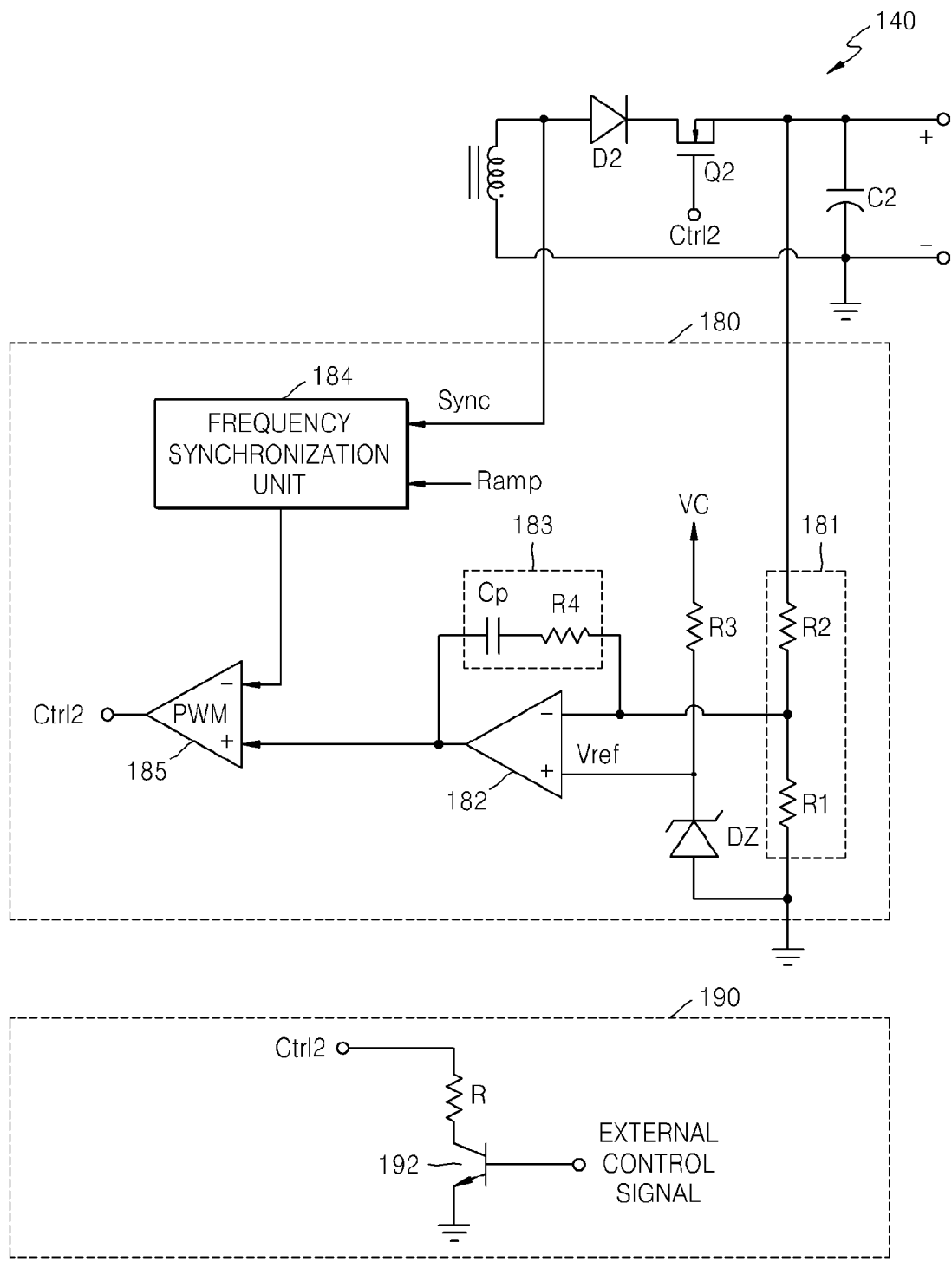
FIG. 12 is a circuit diagram of a second output voltage controller of the multi-voltage power supply of FIG. 11, according to an embodiment of the present general inventive concept.

FIG. 12 is a circuit diagram of the second output voltage controller 180 of the multi-voltage power supply of FIG. 11, according to an embodiment of the present general inventive concept. Referring to FIG. 12, the second output voltage controller 180 can include an output voltage detector 181, an error detector 182, a compensation circuit 183, a frequency synchronization unit 184, and a pulse width modulator (PWM) 185.

The output voltage detector 181 detects the second output voltage $V_{o2}$ in accordance with a predetermined voltage ratio and outputs the detected voltage to the error detector 182. The output voltage detector 181 can include a voltage divider circuit including two resistors, i.e., a first resistor R1 and a second resistor R2. The error detector 182 compares the voltage detected by the output voltage detector 181 with a predetermined reference voltage $V_{ref}$, amplifies and outputs an error value. The error detector 182 can be implemented as a comparator.

A predetermined reference voltage $V_{ref}$, e.g., 2.5 V, is input to a first input terminal of the error detector 182. The reference voltage $V_{ref}$ can be generated by a third resistor R3 connected between a voltage source $V_c$ and ground via a zener diode DZ. The voltage detected by the output voltage detector 181 is input to a second input terminal of the error detector 182.

The compensation circuit 183 stabilizes the second output voltage controller 180 by providing a compensation using negative feedback. The compensation circuit 183 may include a fourth resistor R4 and a capacitor $C_p$ connected in series with each other, which are together connected in parallel to the second input terminal and an output terminal of the error detector 182.

The frequency synchronization unit 184 synchronizes a predetermined ramp signal RAMP input from the outside with a sync signal SYNC detected from a front-end of the second diode D2. The sync signal SYNC can be a square wave having the same frequency as a switching frequency of the first control switch S1 of the primary circuit 110. The ramp signal RAMP can be a signal having a predetermined ramp waveform.

The PWM 185 generates the switching control signal Ctrl2 to control an ON/OFF of the second switch Q2 by comparing a signal, i.e., an amplified error value provided by the error detector 182, to the synchronized ramp signal output from the frequency synchronization unit 184 and applies the generated switching control signal Ctrl2 to the second switch Q2. Herein, the switching control signal Ctrl2 is generated in the same period as that of the synchronized ramp signal, and a delay of the switching control signal Ctrl2 is controlled according to the error value provided by the error detector 182.

Thus, by using the second output voltage controller 180 to feed back the second output voltage $V_{o2}$ and control ON/OFF states of the current flowing through the second diode D2 according to the amplitude of the detected second output voltage $V_{o2}$, the amplitude of a current provided to an output terminal of the second output circuit 140 can be controlled, thereby controlling the second output voltage $V_{o2}$ to have a desired amplitude.

Figure 13:
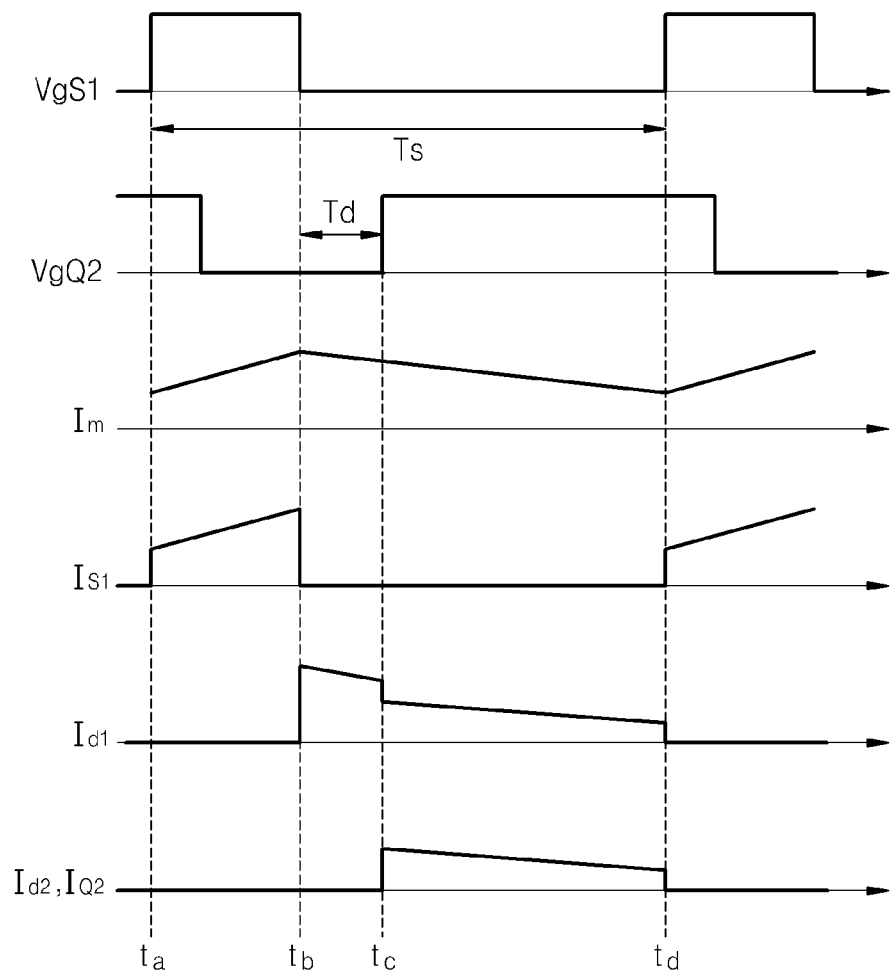
FIG. 13 is a timing diagram illustrating signal transitions according to an operation of the multi-voltage power supply of FIG. 11, according to an embodiment of the present general inventive concept.

FIG. 13 is a timing diagram illustrating signal transitions according to an operation of the multi-voltage power supply of FIG. 11. In FIG. 13, $V_{gS1}$ denotes a voltage across the first control switch S1, and $V_{gQ2}$ denotes a date-source voltage of the second switch Q2. In other words, $V_{gS1}$ and $V_{gQ2}$ indicate operation states of the first control switch S1 and the second switch Q2, respectively. For example, if $V_{gS1}$ or $V_{gQ2}$ has a high level value, the first control switch S1 or the second switch Q2 is in an ON state, and if $V_{gS1}$ or $V_{gQ2}$ has a low level value, the first control switch S1 or the second switch Q2 is in an OFF state. In addition, $T_s$ denotes a switching period of the first control switch S1, and $T_d$ denotes a delay time of the second switch Q2.

Referring to FIGS. 11 through 13, an operation of the first control switch S1 can be divided into an ON state duration (between $t_a$ and $t_b$) and an OFF state duration (between $t_b$ and $t_d$) and the ON and OFF state durations are repeated in the period $T_s$. The second switch Q2 to control the second output voltage $V_{o2}$ repeats ON and OFF states in the same period $T_s$ as the first control switch S1 due to the synchronization. Thus, the second output voltage $V_{o2}$ can be controlled by properly controlling an ON state duration (between $t_b$ and $t_c$) of the second switch Q2 from when a current is transferred to the first and second output circuits 120 and 140 on the second winding side of the transformer T.

If the first control switch S1 is in an ON state, a magnetization inductance current $I_m$ of the transformer T linearly increases, resulting in storage of energy in the form of the magnetization inductance of the transformer T. In this case, a current $I_{d1}$ flowing through the first diode D1 of the first output circuit 120 on the second winding side of the transformer T, a current $I_{d2}$ flowing through the second diode D2 of the second output circuit 140 on the second winding side of the transformer T, and a current $I_{Q2}$ flowing through the second switch Q2 are all 0.

If the first control switch S1 is in an OFF state, a current due to the magnetization inductance of the transformer T is transferred to the first output circuit 120 in the second winding, and the current $I_{d1}$ flowing through the first diode D1 linearly decreases. Thus, the first output voltage $V_{o1}$ is output.

The second switch Q2 turns ON after a predetermined delay time $T_d$ has elapsed according to a feedback value of the second output voltage $V_{o2}$ by control of the second output voltage controller 180, and therefore, a current flows through the second diode D2, thereby outputting the second output voltage $V_{o2}$. If the first control switch S1 turns ON again, even if the second switch Q2 is ON, the currents $I_{d2}$ and $I_{Q2}$ do not flow since the second diode D2 is in an inverse bias state.

Figure 14:
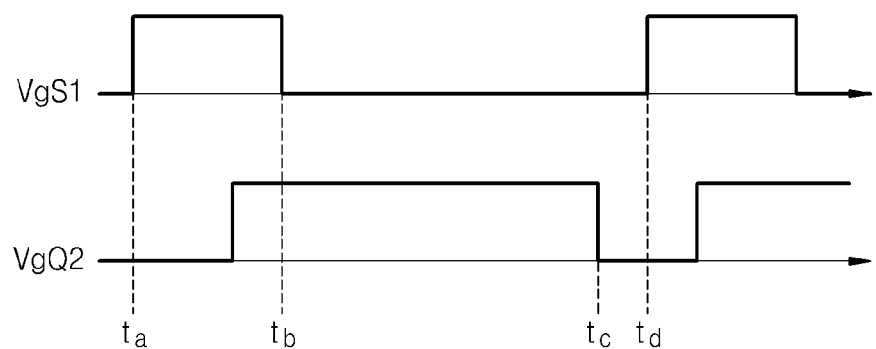
FIG. 14 is a timing diagram illustrating signal transitions according to an operation of the multi-voltage power supply of FIG. 11, according to another embodiment of the present general inventive concept.

FIG. 14 is a timing diagram illustrating signal transitions according to an operation of the multi-voltage power supply of FIG. 11, according to another embodiment of the present general inventive concept. Referring to FIG. 14, an operation of the first control switch S1 can be divided into an ON duration (between $t_a$ and $t_b$) and an OFF duration (between $t_b$ and $t_d$) and the ON and OFF durations are repeated in the period $T_s$. The second switch Q2 to control the second output voltage $V_{o2}$ repeats ON and OFF in the same period $T_s$ as the first control switch S1 due to the synchronization.

In the ON duration (between $t_a$ and $t_b$) of the first control switch S1, since a current is not transferred to the secondary winding, an operation of the second switch Q2 does not influence an operation of the multi-voltage power supply. In the OFF duration (between $t_b$ and $t_d$) of the first control switch S1, the second output voltage $V_{o2}$ can be controlled by controlling the timing of a time $t_c$ at which the second switch Q2 is in an OFF state according to a feedback value of the second output voltage $V_{o2}$.

As described above, according to the present embodiment, by delaying the ON or OFF operation state of the second switch Q2 according to the feedback value of the second output voltage $V_{o2}$, the amount of a current flowing through the second output circuit 140 on the second winding side of the transformer T can be controlled, thereby independently controlling the second output voltage $V_{o2}$. Thus, a multi-voltage current source type power supply having a simple structure can be provided.

Figure 15:
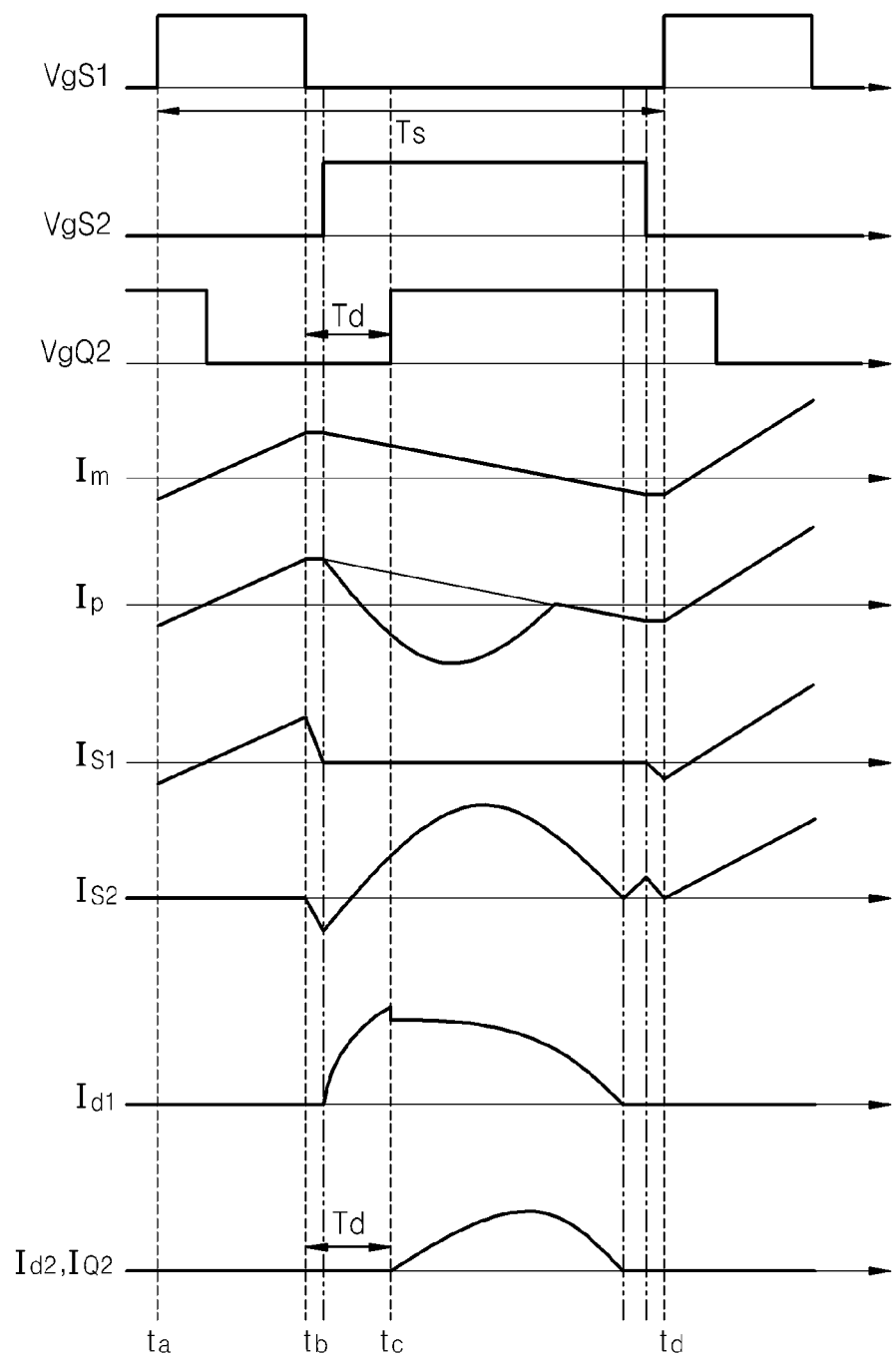
FIG. 15 is a timing diagram illustrating signal transitions according to an operation of the multi-voltage power supply of FIG. 11, according to another embodiment of the present general inventive concept.

FIG. 15 is a timing diagram illustrating signal transitions according to an operation of the multi-voltage power supply of FIG. 5 when the current source type switching circuit 311 of the primary circuit 310 is configured as the active clamp flyback type, according to another embodiment of the present general inventive concept.

In FIG. 15, $V_{gS1}$ denotes a voltage across the first control switch S1, $V_{gS2}$ denotes a voltage across the second control switch S2, and $V_{gQ2}$ denotes a gate-source voltage of the second switch Q2. In other words, $V_{gS1}$, $V_{gS2}$, and $V_{gQ2}$ indicate operation states of the first control switch S1, the second control switch S2, and the second switch Q2, respectively.

Referring to FIGS. 5 and 15, an operation of the first control switch S1 can be divided into an ON duration (between $t_a$ and $t_b$) and an OFF duration (between $t_b$ and $t_d$) and the ON and OFF durations are repeated during the period $T_s$. The second control switch S2 repeats ON and OFF durations complementarily with the first control switch S1. The second switch Q2 to control the second output voltage $V_{o2}$ repeats ON and OFF durations in the same period $T_s$ as the first control switch S1 due to the synchronization.

The second output voltage $V_{o2}$ can be controlled by properly controlling a delay time $T_d$ in an ON duration (between $t_b$ and $t_c$) of the second switch Q2 from when a current is transferred to the first and second output circuits 120 and 140 on the second winding side of the transformer T. In the OFF duration (between $t_b$ and $t_d$) of the first control switch S1, the second control switch S2 is in an ON state and $I_{s2}$ increases, and thereby the leakage inductance resonates through the capacitor $C_c$.

As described above, in a multi-voltage power supply according to the various embodiments of the present general inventive concept, since multiple (at least two) output circuits which are on a secondary winding side of a transformer, for realizing multiple output voltages can be independently controlled, a structure of the output circuits is simple, and a size of the multi-voltage power supply can be significantly reduced. In addition, by linearly controlling the multiple output circuits, the multiple output voltages can be stably controlled regardless of the number of output voltages.

Meanwhile, the present general inventive concept provides an electronic apparatus including the multi-voltage power supply. The electronic apparatus outputs a control signal to provide a low power mode. The multi-voltage power supply can reduce power by using the control signal. In particular, the electronic apparatus includes a set of electronic apparatuses requiring the multi-voltage power supply and using the lower power mode, such as an image forming apparatus, a computer, a TV set, a laundry machine, an air conditioner, and the like.

Figure 16:
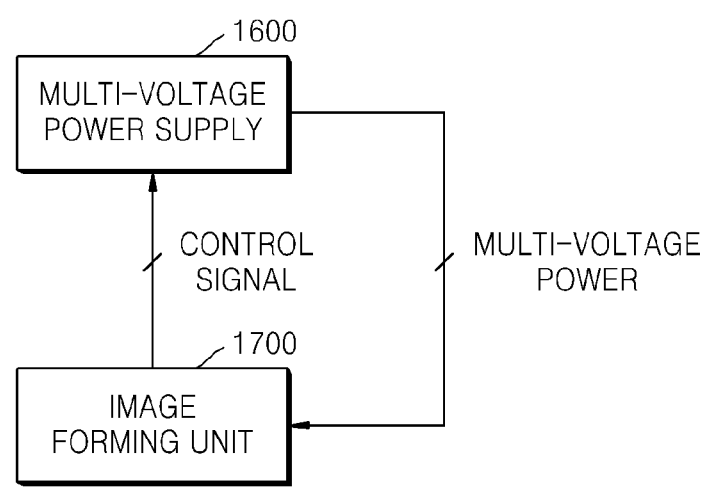
FIG. 16 is a block diagram of an image forming apparatus according to an embodiment of the present general inventive concept.

In particular, the multi-voltage power supply of the present general inventive concept may be included in the image forming apparatus providing the lower power mode. The image forming apparatus of the present general inventive concept includes a multi-voltage power supply 1600 and an image forming unit 1700 as shown in FIG. 16. The multi-voltage power supply 1600 may be the multi-voltage power supply as described with reference to FIGS. 1 through 15, and thus the detailed description thereof is omitted. The image forming unit 1700 forms an image by receiving power supply from the multi-voltage power supply 1600, and outputs a controls signal to reduce power consumption to the multi-voltage power supply 1600 at a standby mode or at the low power mode.

Although the number of output circuits in the secondary winding is illustrated as 2 in the various embodiments described above, it will be understood by those of ordinary skill in the art that a plurality of output circuits on the secondary winding side of the transformer, which are independently controlled, can be configured.

Figure 17:
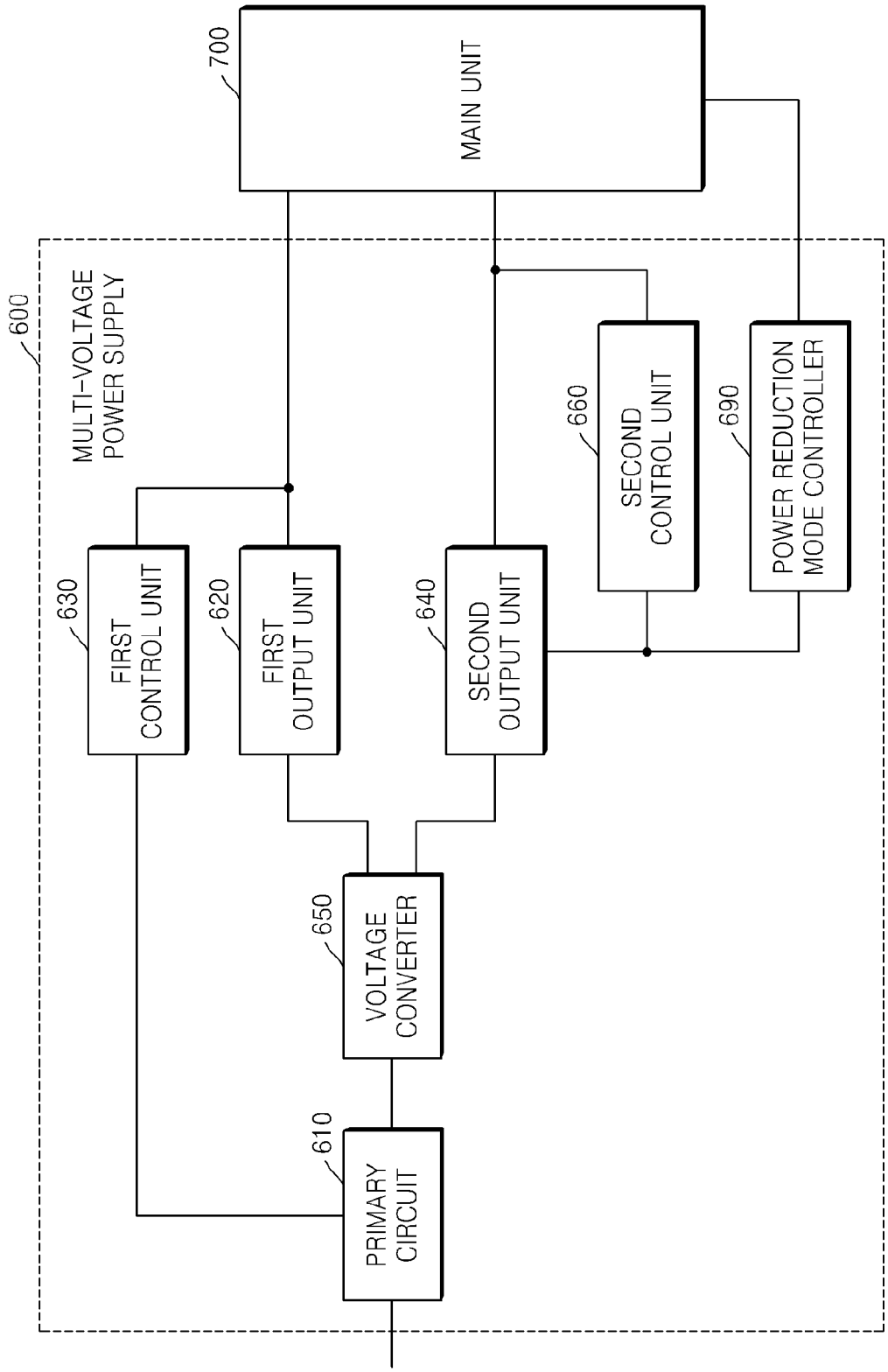
FIG. 17 is a block diagram of an electronic apparatus according to an embodiment of the present general inventive concept.

FIG. 17 illustrates an electronic apparatus according to an exemplary embodiment of the present general inventive concept. The electronic apparatus includes a multi-voltage power supply 600 and a main unit 700. The electronic apparatus may be a type of electronic apparatus that uses power at multiple voltages, such as, for example, a computer, an image forming apparatus, a laptop, a mobile communication device, etc. The multi-voltage power supply 600 supplies power at a plurality of voltages to the main unit 700. The multi-voltage power supply 600 includes a primary circuit 610, a first output unit 620, a first control unit 630, a second output unit 640, a voltage converter 650, a second control unit 660, and a power reduction mode controller 690.

The primary circuit 610 receives power and outputs the power to the voltage converter 650. The voltage converter 650 converts the power received from the primary circuit 610 into a first voltage and a second voltage. The voltage converter 650 outputs the first voltage to the first output unit 620 and outputs the second voltage to the second output unit 640. The first output unit 620 uses the first voltage to output a first output voltage to the main unit 700, and the second output unit 660 uses the second voltage to output a second output voltage to the main unit 700. Although one second output unit 660 is illustrated in FIG. 17, two or more second output units may be provided.

The first control unit 630 controls a level of the voltage the primary circuit 610 applies to the voltage converter 650 by feeding back the first output voltage. The second control unit 660 controls a level of the second output voltage by feeding back the second output voltage. The second control unit 660 may control the level of the second output voltage independent of the level of the first output unit 620.

The power reduction mode controller 690 receives a power reduction mode control signal from the main unit 700 to indicate when the main unit 700 is operating in a power reduction mode. The power reduction mode controller 690 outputs a control signal to the second output unit 640 to control the second output unit 640 to turn off and stop outputting the second output voltage when the main unit 700 is in the power reduction mode. The first output unit 620 may remain operational while the second output unit 640 is turned off. As such, the power consumption of the electronic apparatus can be reduced during a power reduction mode such as, for example, a sleep mode or a low power mode.

A multi-voltage power supply capable of power consumption reduction and an image forming apparatus including the multi-voltage power supply according to the present general inventive concept independently control power output to each output at a sleep mode or at a low power mode and reduce power consumption.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A multi-voltage power supply to provide at least two output voltages, the multi-voltage power supply comprising:
   a transformer configured to comprise a primary coil included in a primary circuit unit, and a first coil and a second coil included in a secondary circuit unit;
   a first output circuit configured to generate a first output voltage using a voltage transferred to the first coil;
   a first output voltage controller configured to control a voltage supplied to the primary coil by feeding back the first output voltage;

a second output circuit configured to generate a second output voltage using a voltage transferred to the second coil;

a second output voltage controller configured to control the second output voltage to feed back the second output voltage; and a power reduction mode controller configured to output a control signal to control an on/off status of outputting of the second output voltage by the one second output circuit according to an external control signal.

2. The multi-voltage power supply of claim 1, wherein the power reduction mode controller comprises:

a switching device that switches between an OFF state and an ON state according to the external control signal which is enabled when power saving is necessary, and outputs the control signal to control the on/off status of outputting of the second output voltage.

3. The multi-voltage power supply of claim 2, wherein the switching device includes at least one of a metal oxide semiconductor field effect transistor (MOSFET) and a bipolar junction transistor (BJT).

4. The multi-voltage power supply of claim 2, wherein the external control signal is output by at least one of an image forming apparatus and a controller of a computer.

5. The multi-voltage power supply of claim 1, wherein, when the multi-voltage power supply comprises a plurality of second output circuits, the power reduction mode controller outputs a single control signal to control the on/off status of outputting of the plurality of second output voltages generated by the plurality of the second output circuits according to the external control signal.

6. The multi-voltage power supply of claim 1, wherein the second output circuit comprises:

a rectifier to rectify the voltage transferred to the second coil of the transformer and to output the rectified voltage; and a switch to linearly switch outputting of the second output voltage by using a control signal output by the second output controller, and to perform the on/off switching operation of outputting of the second output voltage by using the control signal output by the power reduction mode controller.

7. The multi-voltage power supply of claim 6, wherein the second output controller comprises:

a reference voltage generator to generate a reference voltage to be compared to the second output voltage;

an error detector configured to compare the reference voltage generated by the reference voltage generator with the second output voltage and configured to output an error value according to the comparison result;

a compensation circuit connected in parallel to an input terminal of the error detector to which the second output voltage is applied and an output terminal of the error detector, configured to provide a compensation to the error value by using a negative feedback; and a control signal output unit configured to voltage-divide the compensated error value and to output a linear control signal to linearly control the second switch operating in an active region.

8. An image forming apparatus comprising:

an image forming unit configured to form an image by receiving a power supply, and configured to output a power consumption reduction control signal;

a multi-voltage power supply configured to provide a plurality of outputs as the power supply to the image forming unit and configured to receive the power consumption reduction control signal from the image forming unit, the multi-voltage power supply comprising:

a transformer configured to comprise a primary coil included in a primary circuit unit, and a first coil and a second coil included in a secondary circuit unit;

a first output circuit configured to generate a first output voltage using a voltage transferred to the first coil;

a first output voltage controller configured to control a voltage supplied to the primary coil by feeding back the first output voltage;

a second output circuit configured to generate a second output voltage using the voltage transferred to the at least one second coil;

a second output controller configured to control the second output voltage to feed back the second output voltage; and a power reduction mode controller configured to output a control signal to control an on/off status of outputting of the second output voltage output by the second output circuit according to the power consumption reduction control signal.

9. The image forming apparatus of claim 8, wherein the power reduction mode controller comprises:

a switching device that switches between an ON state and an OFF state according to the power consumption reduction control signal which is enabled when power saving is necessary, and outputs the control signal to control the on/off status of outputting the at least one second output voltage.

10. A multi-voltage power supply to provide at least two output voltages, the multi-voltage power supply comprising:

a transformer configured to comprise a primary coil included in a primary circuit unit, and a first coil and a second coil included in a secondary circuit unit;

a first output circuit configured to generate a first output voltage using a voltage transferred to the first coil;

a first output voltage controller configured to control a voltage supplied to the primary coil by feeding back the first output voltage;

a second output circuit configured to rectify a voltage transferred to the second coil and to generate a second output voltage by switching an on/off status of a switch corresponding to the second output voltage;

a second output controller configured to control an on/off status of the second switch of the second output circuit to feed back the second output voltage, the second output controller comprising:

an output voltage detector configured to detect the second output voltage;

an error detector configured to compare the second output voltage detected by the output voltage detector with a predetermined reference voltage, and to output an error value according to the comparison result;

a frequency synchronization unit configured to synchronize a predetermined ramp signal input from the outside with a switching frequency of the primary winding coil of the transformer and configured to output the synchronized signal;

a compensation circuit connected in parallel to an input terminal of the error detector to which the second output voltage is applied and an output terminal of the error detector to provide a compensation to the error value by using a negative feedback; and a pulse width modulator (PWM) configured to generate a first control signal to control a switching operation of the switch of the second output circuit by comparing an output signal provided by the error detector to the synchronized ramp signal output from the frequency synchronization unit; and a power reduction mode controller configured to output a second control signal to control an on/off status of the switch of the second output circuit according to an external control signal.

11. The multi-voltage power supply of claim 10, wherein the at least one power reduction mode controller comprises:

a switching device that switches between an OFF state and an ON state according to the external control signal which is enabled when power saving is necessary, and outputs the control signal to control the on/off status of outputting the second output voltage.

12. The multi-voltage power supply of claim 11, wherein the switching device includes at least one of a metal oxide semiconductor field effect transistor (MOSFET) or a bipolar junction transistor (BJT).

13. The multi-voltage power supply of claim 11, wherein the external control signal is output by at least one of an image forming apparatus and a controller of a computer.

14. The multi-voltage power supply of claim 10, wherein, when the multi-voltage power supply comprises a plurality of second output circuits, the power reduction mode controller outputs a single second control signal to commonly control the on/off status of outputting of a plurality of second output voltage generated by the plurality of the second output circuits according to the external control signal.

15. An image forming apparatus comprising:

an image forming unit to form an image by receiving a power supply, and to output a power consumption reduction control signal; and a multi-voltage power supply configured to provide a plurality of outputs as the power supply to the image forming unit and to receive the power consumption reduction control signal from the image forming unit, the multi-voltage power supply comprising:

a transformer configured to comprise a primary coil included in a primary circuit unit, and a first coil and a second coil included in a secondary circuit unit;

a first output circuit configured to generate a first output voltage using a voltage transferred to the first coil;

a first output voltage controller configured to control a voltage supplied to the primary coil by feeding back the first output voltage;

a second output circuit configured to rectify the voltage transferred to the second coil and to generate a second output voltage by switching an on/off status of a second switch corresponding to the second output voltage, the second output circuit comprising:

a rectifier configured to rectify the voltage transferred to the second coil of the transformer and to output the rectified voltage; and a switch configured to linearly switch outputting of the second output voltage according to a first control signal, and to perform an on/off switching operation on outputting of the second output voltage according to a second control signal;

a second output controller configured to feed back the second output voltage to control the on/off status of the switch of the second output circuit, the second output controller comprising:

an output voltage detector configured to detect the second output voltage;

an error detector to compare the second output voltage detected by the output voltage detector with a predetermined reference voltage, and to output an error value according to the comparison result;

a frequency synchronization unit configured to synchronize a predetermined ramp signal input from the outside with a switching frequency of the primary winding of the transformer and to output the synchronized signal;

a compensation circuit connected in parallel to an input terminal of the error detector to which the second output voltage is applied and an output terminal of the error detector, configured to provide a compensation to the error value by using a negative feedback; and a pulse width modulator (PWM) configured to generate the first control signal to control a switching operation of the switch by comparing an output signal provided by the error detector to the synchronized ramp signal output from the frequency synchronization unit;

a power reduction mode controller configured to output the second control signal to control the on/off status of the switch of the second output circuit according to an external control signal.

16. The image forming apparatus of claim 15, wherein the power reduction mode controller comprises:

a switching device that switches between an OFF state and an ON state according to the external control signal which is enabled when power saving is necessary, and outputs the control signal to control the on/off status of outputting the second output voltage.

* * * * *

UNITED STATES PATENT AND TRADEMARK OFFICE
CERTIFICATE OF CORRECTION

| | |
|---|---|
| PATENT NO. | : 9,099,927 B2 |
| APPLICATION NO. | : 13/334582 |
| DATED | : August 4, 2015 |
| INVENTOR(S) | : Jong-moon Choi |

It is certified that error appears in the above-identified patent and that said Letters Patent is hereby corrected as shown below:

In the claims,

Claim 11, Column 21, Line 8

After "the" delete "at least one".

Signed and Sealed this
Twenty-fourth Day of November, 2015

Michelle K. Lee
*Director of the United States Patent and Trademark Office*